(12) United States Patent
Gomez et al.

(10) Patent No.: US 11,880,183 B2
(45) Date of Patent: *Jan. 23, 2024

(54) SYSTEM AND METHOD FOR EVALUATING HYDRAULIC SYSTEM EVENTS AND EXECUTING RESPONSES

(71) Applicant: Fluid Power AI, LLC, Irvine, CA (US)

(72) Inventors: Jose Maria Guadalupe Gomez, San Diego, CA (US); Francis Mitchell Toglia, San Diego, CA (US); Mario Gomez Narvaez, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,342

(22) Filed: Apr. 4, 2023

(65) Prior Publication Data

US 2023/0259097 A1 Aug. 17, 2023

Related U.S. Application Data

(63) Continuation of application No. 17/687,116, filed on Mar. 4, 2022, now Pat. No. 11,650,567, which is a continuation of application No. 17/182,117, filed on Feb. 22, 2021, now Pat. No. 11,300,942, which is a continuation of application No. 16/939,026, filed on Jul. 26, 2020, now Pat. No. 10,962,955.

(60) Provisional application No. 62/879,290, filed on Jul. 26, 2019.

(51) Int. Cl.

| G05B 19/406 | (2006.01) |
| G01K 13/02 | (2021.01) |
| G01F 1/10 | (2006.01) |
| G01M 3/02 | (2006.01) |
| G06N 20/00 | (2019.01) |
| G01L 13/00 | (2006.01) |

(52) U.S. Cl.
CPC ............. *G05B 19/406* (2013.01); *G01F 1/10* (2013.01); *G01K 13/02* (2013.01); *G01L 13/00* (2013.01); *G01M 3/02* (2013.01); *G06N 20/00* (2019.01); *G05B 2219/41273* (2013.01)

(58) Field of Classification Search
CPC ............................. G05B 19/406; G06N 20/00
USPC ......................................................... 702/184
See application file for complete search history.

(56) References Cited

U.S. PATENT DOCUMENTS

| 6,330,525 | B1 | 12/2001 | Hays et al. |
| 6,823,289 | B2 | 11/2004 | Kasuya et al. |
| 7,318,007 | B2 * | 1/2008 | Barkhoudarian ...... G01H 1/003 |
| | | | 702/184 |
| 8,843,328 | B2 | 9/2014 | Curtiss, III |
| 9,051,945 | B2 | 6/2015 | Hague |
| 9,275,536 | B2 | 3/2016 | Wetherill et al. |
| 9,443,195 | B2 | 9/2016 | Micali et al. |

(Continued)

*Primary Examiner* — Ricky Go
(74) *Attorney, Agent, or Firm* — Ivan J. Wong

(57) ABSTRACT

A system includes sensors for monitoring signals, and a processing system executes one or more methods for identification of system events, from the signals, corresponding to state changes and performance of the system and/or its subcomponents. Event identification is performed with classification and/or other machine learning algorithms, with generation of novel training data sets. The sensor(s) can also be used to determine power consumption information about the system and/or its subcomponents. The system processes event-associated outputs for execution of actions for improving system performance, along with other downstream applications.

20 Claims, 13 Drawing Sheets

(56) References Cited

U.S. PATENT DOCUMENTS

| | | |
|---|---|---|
| 9,699,529 B1 | 7/2017 | Petri et al. |
| 9,739,813 B2 | 8/2017 | Houlette et al. |
| 9,790,938 B2 | 10/2017 | Clifton et al. |
| 9,857,256 B2 | 1/2018 | Poissy |
| 10,175,276 B2 | 1/2019 | Fishburn et al. |
| 2005/0096873 A1* | 5/2005 | Klein .................... G01H 1/006 702/184 |
| 2005/0262838 A1 | 12/2005 | Kageyama et al. |
| 2006/0182636 A1 | 8/2006 | Ivantysynova et al. |
| 2011/0077827 A1 | 3/2011 | Arshad et al. |
| 2016/0195093 A1 | 7/2016 | Carpenter et al. |

* cited by examiner (INTERIOR ASSEMBLY VIEW)

(HOUSING TOP, TOP VIEW)

(HOUSING TOP, SIDE VIEW)

(HOUSING TOP, BOTTOM VIEW)

(HOUSING BOTTOM, BOTTOM VIEW)

(HOUSING BOTTOM, CROSS SECTION VIEW)

SYSTEM AND METHOD FOR EVALUATING HYDRAULIC SYSTEM EVENTS AND EXECUTING RESPONSES

CROSS-REFERENCE TO RELATED APPLICATIONS

This application is a continuation of U.S. application Ser. No. 17/687,116 filed 4 Mar. 2022, which is a continuation of U.S. application Ser. No. 17/182,117 filed on 22 Feb. 2021 and now issued as U.S. Pat. No. 11,300,942 on 12 Apr. 2022, which is a continuation of U.S. application Ser. No. 16/939,026 filed on 26 Jul. 2020 and now issued as U.S. Pat. No. 10,962,955 on 30 Mar. 2021, which claims the benefit of U.S. Provisional Application No. 62/879,290 filed on 26 Jul. 2019, which are each incorporated in its entirety herein by this reference.

TECHNICAL FIELD

This invention relates generally to fields related to hydraulic system evaluation, and more specifically to new and useful systems and methods for evaluating hydraulic system events at subcomponent and global levels, with generation of analyses to improve system maintenance and operation.

BACKGROUND

The commercial utilization of and ongoing costs of using hydraulic equipment in industry and other sectors is greatly impacted by proper maintenance practices that include regular service and replacement of system components. Furthermore, the technical domain knowledge required to properly troubleshoot and diagnose these complex systems is not readily available to the majority of equipment owners and operators that rely on these systems to produce their core products and services. The high opportunity cost of equipment downtime and the lack of resources to properly diagnose hydraulic systems, produces reactive maintenance practices where equipment operates inefficiently for long periods of time before finally failing. Without the proper tools and domain expertise, technicians are typically under pressure to replace components in order to get the equipment back in service, once there is a failure event, but do not resolve the root cause of failure. This leads to accelerated system wear that results in an endless costly battle to keep systems in production. As such, existing solutions are non-ideal.

Unexpected downtime and poor system efficiency thus have associated costs that can be prevented or reduced with better monitoring, forecasting and troubleshooting systems. Current solutions for full system monitoring that can diagnose subcomponent issues in hydraulic equipment use many distributed sensors and custom algorithms. Implementing these options requires application-specific domain expertise, and the resources to design, deploy and maintain equipment is typically a non-optimal solution for hydraulic equipment owners and operators.

Thus, there is a need in fields implementing hydraulic equipment to create new, scalable, and useful systems and methods for evaluating hydraulic system events at subcomponent and global levels, with generation of analyses to improve system operation and maintenance effectively lowering total cost of ownership and maximize production output.

DESCRIPTION OF THE PREFERRED EMBODIMENTS

Figure 1A:
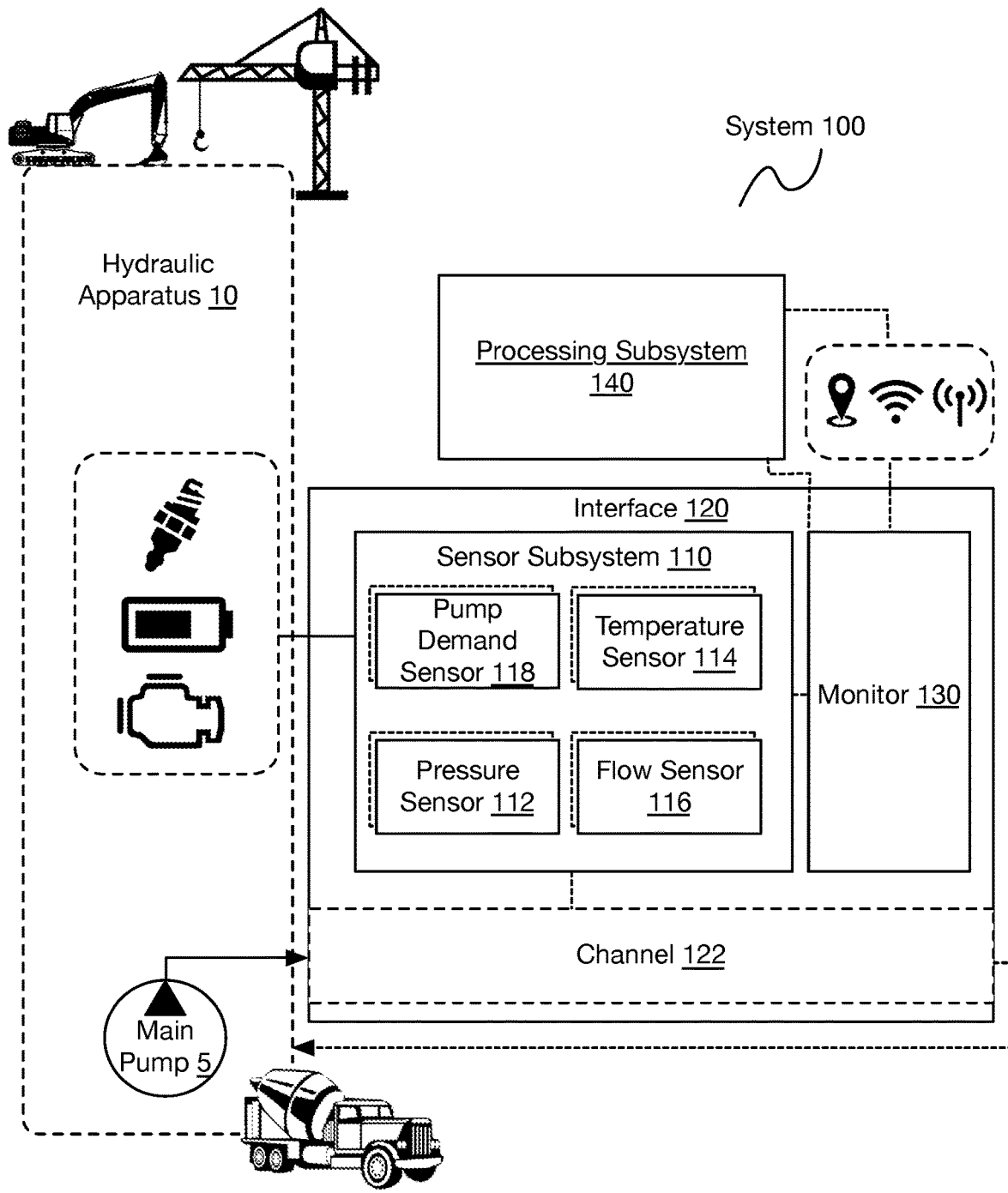
FIG. 1A depicts an embodiment of a system for hydraulic apparatus monitoring.

The following description of the preferred embodiments of the invention is not intended to limit the invention to these preferred embodiments, but rather to enable any person skilled in the art to make and use this invention.

1. Benefits

The inventions associated with the system and method can confer several benefits over conventional systems and methods, and such inventions are further implemented into many practical applications across various disciplines.

For instance, the inventions described provide a sensor system and platform for signal analysis, which provide improved tools for monitoring, forecasting, and troubleshooting events (e.g., failure modes, lifespans, etc.) of hydraulic equipment (e.g., heavy mobile equipment, such as excavators, oil rig drilling apparatuses, cement trucks, garbage trucks, etc. and/or fixed equipment, such as injection molding machines, overhead cranes, etc.) at global and subcomponent levels. Such inventions prevent unexpected and unplanned maintenance events associated with one or more components (e.g., hose failures, impacts, etc.) which have significant associated costs, thereby improving hydraulic equipment availability, improving equipment performance and/or allowing hydraulic equipment to have extended lifespans of use. Such inventions also can return outputs for anticipating future adverse events, such that preventative maintenance measures can be taken.

Additionally, the inventions described implement algorithms and/or models for analyzing individual subcomponents of hydraulic equipment with a single set of sensors coupled to the hydraulic equipment at a single position, thereby enabling users to obtain operating life, health, remaining life, and/or other statuses of individual subcomponents in a manner that is significantly more efficient and lower in cost. Such a sensor cluster can be used to determine energy parameters of the hydraulic equipment (e.g., energy input, energy produced, etc.). The algorithms and/or models can also characterize global hydraulic equipment statuses and/or events from the single set of sensors.

Additionally, the inventions described implement rapid processing of signal streams, with disaggregation of noisy and/or overlapping signals (e.g., signals with extremely high signal-to-noise ratio) to extract insights related to hydraulic equipment statuses and events, in a manner that cannot be practically performed in the human mind.

Additionally, the invention(s) improves the functioning of computing systems related to fields implementing hydraulic equipment, by enabling more efficient processing of signal streams to generate analyses related to hydraulic equipment statuses and events.

Additionally, the inventions apply outputs of the analyses to effect one or more treatments for specific subcomponent or global hydraulic equipment conditions, thereby providing practical applications of the algorithms involved.

Additionally, the inventions involve collection of signals from a hydraulic equipment position, apply one or more transformations to the signals to generated modified digital objects, create improved training data sets for machine learning/classification algorithms, and iteratively train the machine learning/classification algorithms, such that hydraulic equipment events and statuses can be returned upon processing subsequent signals.

Additionally, the invention(s) described create classifiers for hydraulic equipment events (at global and subcomponent levels), using simplified signal streams. Extensions of the invention(s) can also be used to create models that simulate hydraulic equipment behavior and performance under various use scenarios, in relation to anticipated events (e.g., failure modes) corresponding to use scenarios.

Additionally, the invention(s) described collect signals from a sensor subsystem coupled to hydraulic equipment, process the collected signals with trained algorithms to return subcomponent and global hydraulic equipment events, automatically generate notification upon identification of an event or condition satisfying certain parameters, and transmit the message to relevant entities associated with the hydraulic equipment, such that the entities can respond to the event or condition properly.

Additionally or alternatively, the invention(s) can confer any other suitable benefit.

2. System

As shown in FIG. 1A, an embodiment of a system 100 for evaluating hydraulic apparatus events includes: a sensor subsystem 110 (e.g., sensor cluster) including one or more of: a pressure sensor 112, a temperature sensor 114, a flow sensor 116, and a pump demand sensor 118; an interface 120 between the sensor subsystem 110 and a hydraulic pump 5 of a hydraulic apparatus 10; a monitor 130 coupled to the sensor subsystem 110 and configured to receive outputs of the sensor subsystem 110; and a processing subsystem 140 operatively coupled to the monitor 130 and including non-transitory media storing instructions that, when executed by the processing subsystem 140, perform operations for identifying, from outputs of the monitor 130/sensor subsystem 110, a set of unique signatures corresponding to states and events of the hydraulic apparatus 10. The set of unique signatures are then used by the processing subsystem 140 to execute actions configured to respond to the states/events appropriately, thereby improving performance of the hydraulic apparatus (e.g., in terms of output, in terms of efficiency, in terms of correcting undesired statuses, in terms of responding to failure modes, etc.).

Figure 1B:
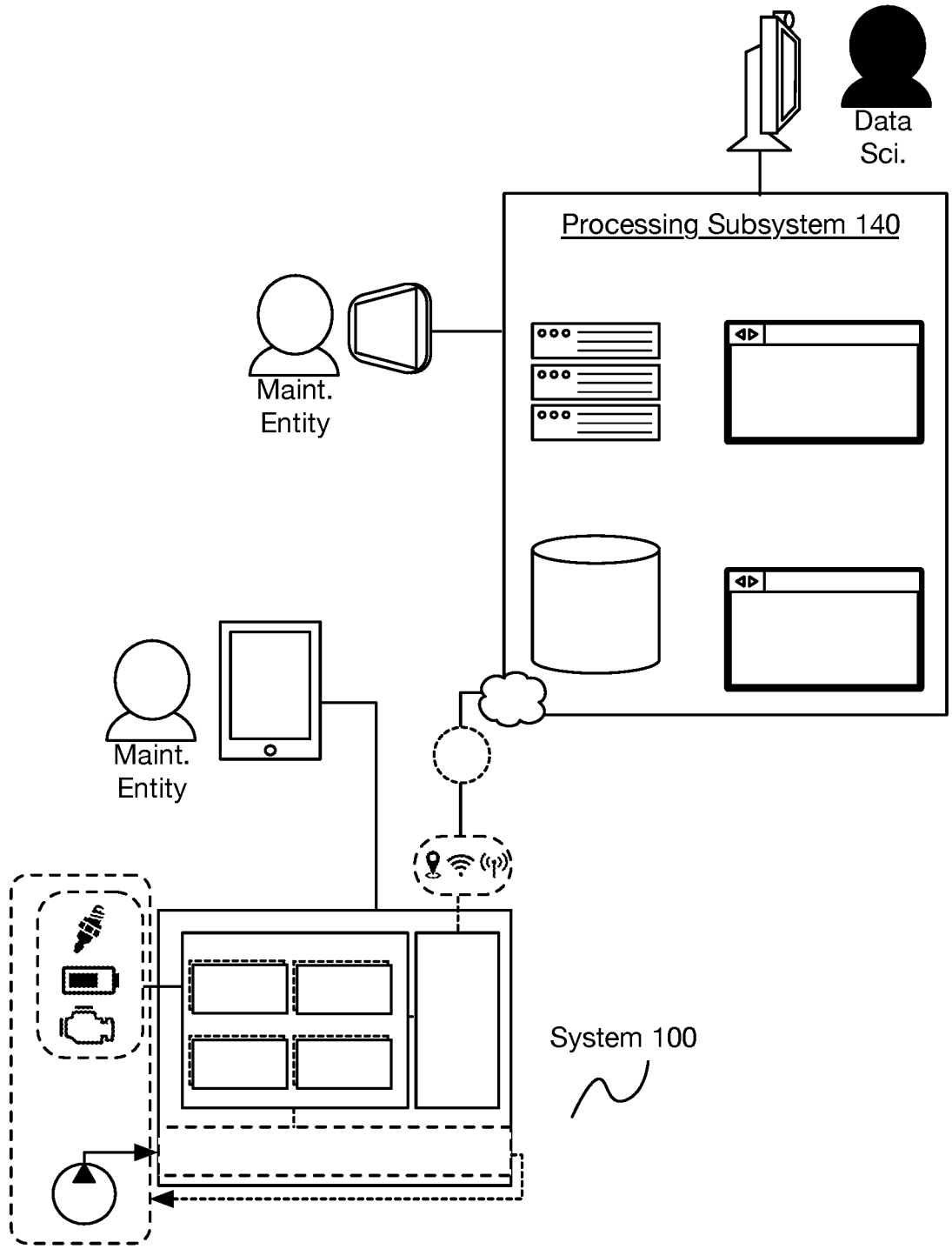
FIG. 1B depicts an embodiment of a system for hydraulic apparatus monitoring, with interfaces with various entities.

As shown in FIG. 1B, the processing subsystem 140 can include architecture for processing data, generating outputs, storing data, and/or providing interfaces to various entities/users, as described in further detail below.

The system 100 functions to provide improved tools for monitoring, forecasting, and troubleshooting events (e.g., failure modes, lifespans, etc.) of hydraulic apparatus components at global and subcomponent levels. In particular, in applications where the system 100 is coupled to mobile vehicles (e.g., in the trucking industry) and/or in other industrial applications, the system 100 can enable assessments of hydraulic apparatus health and other anticipated events at subcomponent and global levels, in an improved manner. Subcomponents monitored by the system 100 can be upstream of the hydraulic pump, at the pump, downstream of the hydraulic pump, and/or associated with the hydraulic pump, and in examples, can include any one or more of: valve components, pump oil, piston components, motor components, or other suitable hydraulic apparatus subcomponents. The system 100 can also generate usage information from signals processed, at global and subcomponent levels of abstraction.

Such inventions associated with the system 100 thus prevent unexpected and unplanned maintenance events which have significant associated costs, thereby improving hydraulic system performance and/or allow hydraulic systems to have extended lifespans of use. Additionally, the system 100 functions to analyze individual subcomponents of hydraulic equipment with a single set of sensors coupled to the hydraulic equipment at a single position, thereby enabling operators to obtain operating life, health, remaining life, and/or other statuses of individual subcomponents in a manner that is significantly more efficient and lower in cost. In particular, the set of sensors can be used to assess system statuses and events upstream and/or downstream of the position of coupling between the sensors and the hydraulic apparatus (e.g., output of main hydraulic pump 5), in a manner that has not previously been achieved. Furthermore, the system 100 functions to rapidly process signal streams, with disaggregation of multiple signal types to extract insights related to hydraulic apparatus statuses and events.

In specific examples, the system 100 provides innovation in advanced sensor system design and machine learning approaches, in fields using hydraulic systems, to provide a plug-and-play, real-time monitoring and predictive maintenance solution in a cost-effective manner. In particular, the system 100 monitors a small number of system parameters and transmits data for processing (e.g., at least in part in cloud computing systems, in coordination between cloud and non-cloud based computing systems) to determine health statuses of the associated hydraulic systems, at the component level, in real time. Hydraulic system statuses and actionable alerts are the provided by the system 100 to the user (e.g., using a customer portal), to enable them to streamline their equipment maintenance procedures and prevent downtime.

In embodiments, the system 100 can be configured to perform steps of embodiments, variations, and examples of a method 300 described in Section 3 below. However, the system 100 can additionally or alternatively be configured to perform other suitable methods.

Further details of components of the system 100 are described in the following sections.

2.1 System—Sensor Cluster

Figure 2A:
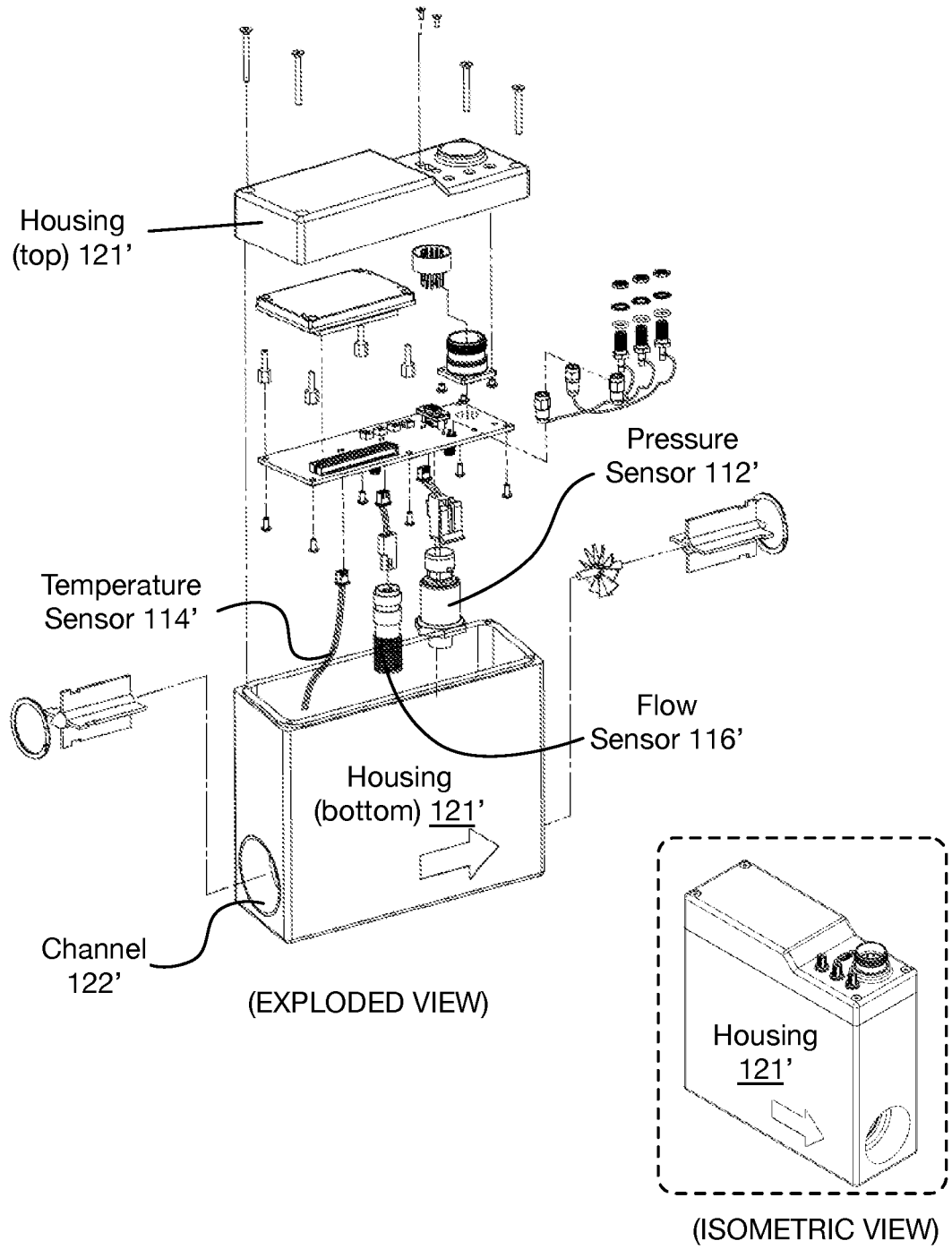
FIGS. 2A-2D depict views of an example of a system for hydraulic apparatus monitoring.
Figure 2B:
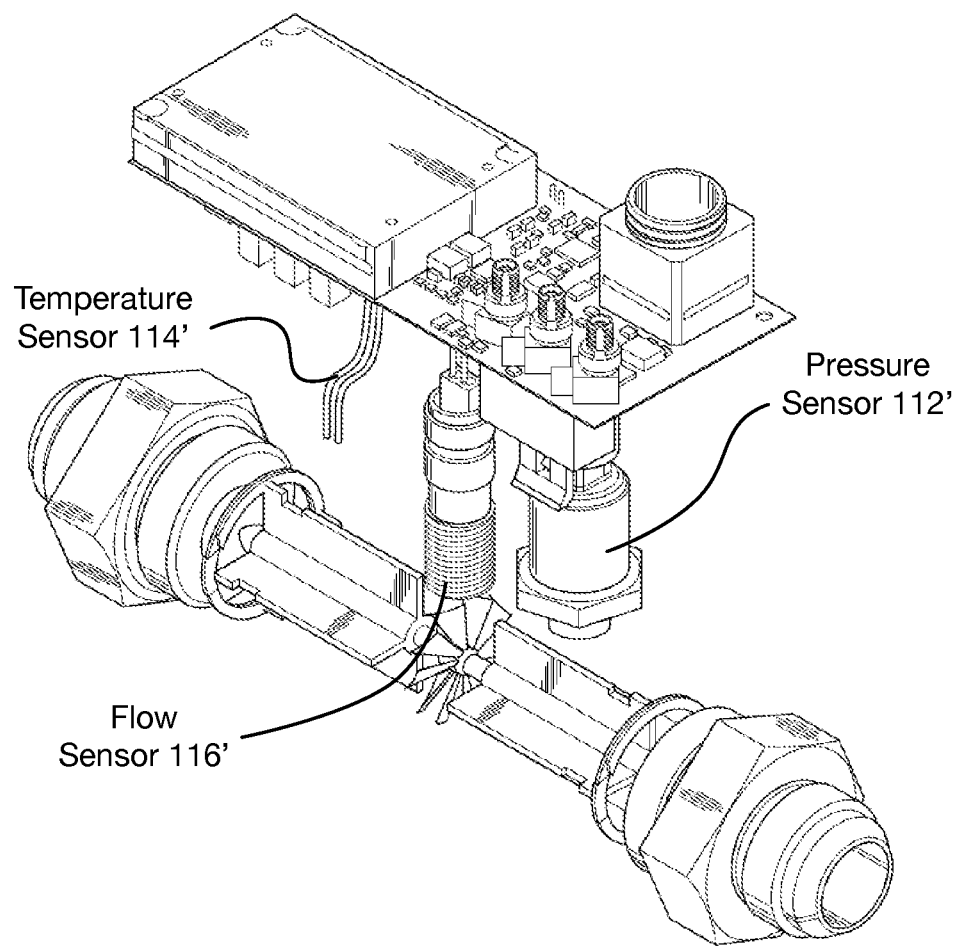
Figure 2C:
Figure 2C:
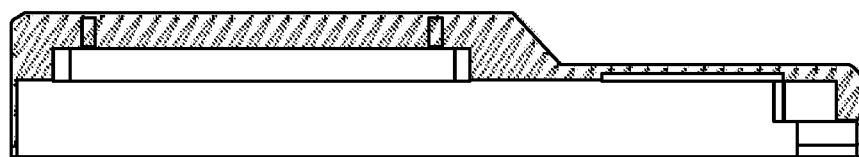
Figure 2C:
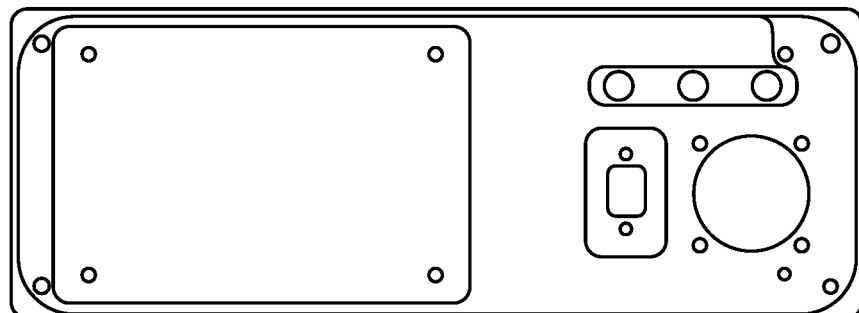
Figure 2D:
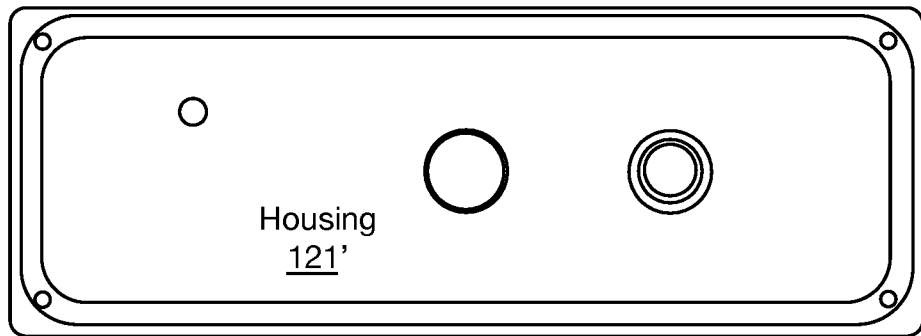
Figure 2D:
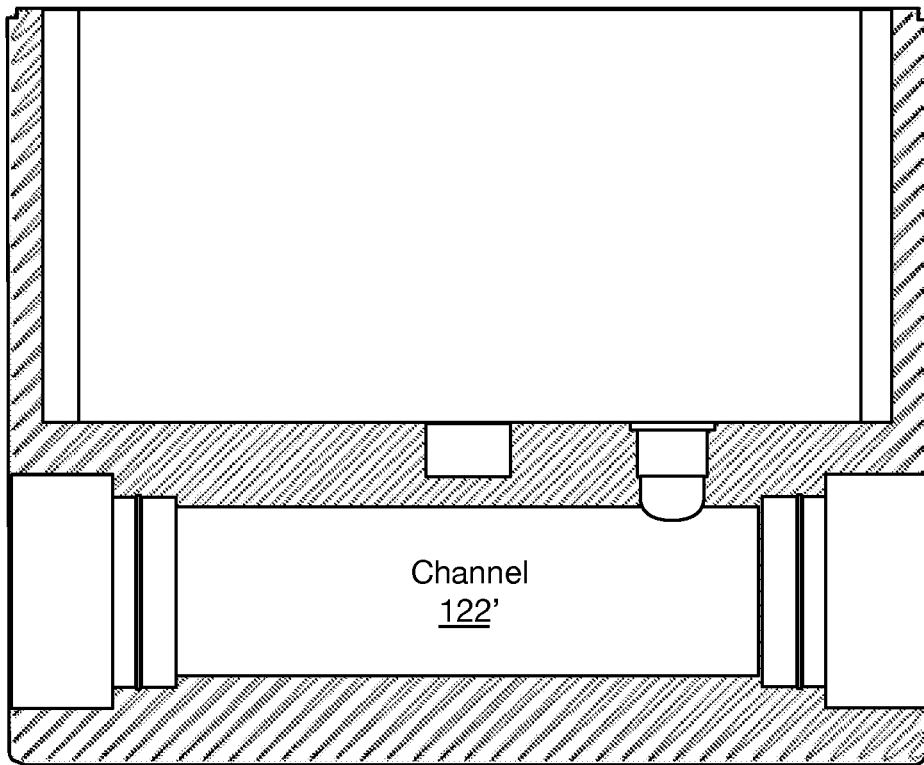

As shown in FIGS. 1A and 2A-2B, the system 100 includes a sensor subsystem 110 including one or more of: a pressure sensor 112, 112', a temperature sensor 114, 114', a flow sensor 116,116', and a pump demand sensor 118. The sensors of the sensor subsystem 110 collectively function to generate signals for monitoring a set (e.g., minimized set, discrete set, etc.) of signal types and/or number of a parameters, from which performance of the hydraulic apparatus and/or demand on the hydraulic apparatus can be extracted. The data can then be processed according to methods described in more detail below, in order to efficiently assess statuses of and/or anticipate events of the hydraulic apparatus and its subcomponents. As described above and further below, the set of sensors 110 can include: a pressure sensor 112, a temperature sensor 114, a flow sensor 116, and a pump demand sensor 118.

The pressure sensor 112 functions to detect the pressure of the hydraulic fluid of the hydraulic apparatus (e.g., at the hydraulic pump 5 outlet, as described in relation to the interface 120 below). In embodiments, the pressure sensor 112 converts sensed pressures into electrical signals (e.g., analog electrical signals) for reception and/or pre-processing by the monitor 130. In variations, the pressure sensor 112 can include components (e.g., diaphragms, other components) in contact or communication with hydraulic fluid of the hydraulic apparatus (e.g., through channel 122 of interface 120 described below), thereby enabling direct sensing of pressure of the hydraulic fluid (e.g., at the main hydraulic pump 5 output). Alternatively, in other variations, the pressure sensor 112 may not include components that are directly in contact with hydraulic fluid, and instead operate in another manner (e.g., by measuring deformation of a component contacting the hydraulic fluid). In a specific example, the pressure sensor 112 can include a strain gauge coupled to an output line or other conduit associated with hydraulic fluid of the hydraulic apparatus, and measure deformation (e.g., circumferential deformation, longitudinal deformation, etc.) of the conduit as an indirect measure of internal pressure.

In variations, the pressure sensor 112 can output a signal with a desired current and/or rate. In a specific example, as shown in FIGS. 2A-2B, the pressure sensor 112' outputs a 4-20 mA current signal, which is converted to a voltage by the monitor 130 and/or processing subsystem 140 described in more detail below. In the specific example, the pressure sensor 112 updates pressure readings at a rate of up to 1000 Hz (or alternatively, of up to 1,000,000 Hz), and downstream conditioning using an analog-to-digital converter (ADC) involves sampling at a rate greater than the rate of updated readings in order to allow for digital filtering and signal processing. Variations of the specific example of the pressure sensor 112 can, however, generate other suitable signal outputs at other suitable rates.

The temperature sensor 114 functions to measure the temperature of the hydraulic fluid of the hydraulic apparatus (e.g., at the hydraulic pump 5 outlet, as described in relation to the interface 120 below). Similar to the pressure sensor 112, the temperature sensor 114 can include components (e.g., probes, other components) in contact or thermal communication with hydraulic fluid of the hydraulic apparatus (e.g., through channel 122 of interface 120 described below), thereby enabling direct sensing of temperature of the hydraulic fluid (e.g., at the main hydraulic pump 5 output). Alternatively, in other variations, the temperature sensor 114 may not include components that are directly in contact with hydraulic fluid, and instead operate in another manner (e.g., by measuring temperature of a component contacting the hydraulic fluid, by measuring temperature of a component where the temperature of the component is a function of the temperature of the hydraulic fluid). In a specific example, as shown in FIGS. 2A-2B, the temperature sensor 114' can include a T-type thermocouple, wherein the thermocouple output is received by the monitor 130 and/or processing subsystem 140 described in more detail below.

The flow sensor 116 functions to measure flow characteristics of the hydraulic apparatus (e.g., at the main output of the hydraulic pump 5 of the hydraulic apparatus) by generating electrical signals (e.g., voltage signals with waveform characteristics) that are proportional to flow rate and other characteristics. The flow sensor 116 can include components that are inline with flow through the hydraulic apparatus (e.g., inline with the main hydraulic pump 5 output). Additionally or alternatively, the flow sensor 116 can include components that determine flow characteristics from differential pressures (e.g., by measuring pressure differentials across a known junction geometry). Still alternatively, the flow sensor 116 can include non-contact sensing components for measuring flow characteristics (e.g., as in ultrasonic flow sensors).

In a specific example, as shown in FIGS. 2A-2B, the flow sensor 116' includes a turbine flow meter with a magnetic pickup to sense motion of the turbine blade within the flow meter body. In the specific example, the output of the flow sensor 116 is a peak-to-peak wave with a frequency that is proportional to the flow rate. The maximum frequency of the wave is about 1000 Hz in specific applications of use, and downstream conditioning using an analog-to-digital converter (ADC) involves sampling at a rate (e.g., 10 KHz) greater than the frequency, with conversion of the analog wave into a digital square wave with equal frequency.

The pump demand sensor 118 functions to measure varying pump demand for the hydraulic apparatus. The pump demand sensor 118 can measure pump demand in relation to operational demand of the hydraulic apparatus, in terms of revolutions per minute (RPM) or another suitable measure. In particular, in contrast to some industrial applications where RPM of the hydraulic pump 5 of the hydraulic apparatus is constant at the synchronous electric motor speeds, mobile applications of use (e.g., in relation to trucking and other mobile applications), where the hydraulic pump 5 of the hydraulic apparatus is coupled directly to the engine or transmission, can require variable engine speeds, which causes hydraulic pump 5 flow to vary.

In a specific example, the pump demand sensor 118 is coupled to a vehicle interface (e.g., J1939 vehicle interface) as a link to the vehicle interface for monitoring engine RPM. The approach of the specific example uses a CAN 2.0 physical interface which outputs a CAN voltage and/or packet indicative of pump RPM, and downstream signal conditioning by the monitor 130 and/or processing subsystem 140 described in more detail below transforms the CAN voltage to 3.3 transistor-transistor logic (ttl) voltage.

In variations, sensors of the sensor subsystem 110 can be isolated from each other or otherwise configured to prevent undesired signal interference or crosstalk, thereby improving quality of training data, test data, and data processed during normal operation of the system 100. Outputs can further be isolated from each other in relation to architecture of electronics of the monitor 130 and/or processing subsystem 140 described below.

While a unit of each sensor type is described above, in variations of the system 100, the sensor subsystem 110 can include multiple units of each sensor type and/or other types of sensors. Furthermore, the sensor(s) of various types can be positioned to interrogate fluid flow at identical positions of the hydraulic apparatus (e.g., for sensor redundancy), or alternatively, can be configured to interrogate fluid flow at different positions of the hydraulic apparatus in order to generate measurements for comparative analyses, or analyses requiring differential measurements.

In variations, the sensor subsystem 110 can include sensor types not described above. For instance, the sensor subsystem 110 can include one or more of: sensors for filter heads of the hydraulic apparatus, in order to detect when a filter replacement is needed (e.g., where the filter head sensors monitor a pressure differential switch at the filter head); magnetic sensors (e.g., Hall Effect sensors) used to measure hydraulic motor RPM or other linear/angular position sensors for detection of hydraulic actuator motion; other linear position sensors (e.g., linear encoders); other angular motion sensors (e.g., angular encoders); weight sensors (e.g., to interrogate vehicle load and distributions or other loads/distributions associated with non-vehicle applications); ultrasonic/vibration sensors coupled to one or more motors and/or cylinders associated with the hydraulic apparatus; and other sensor types.

The sensor subsystem 110 can additionally or alternatively omit one or more sensor types listed above. For instance, in relation to the processing subsystem 140 described in more detail below and/or implementation of training datasets in Section 3 below, the sensor subsystem 10 can omit sensor types as required, in relation to assessing hydraulic apparatus subcomponent statuses and/or events with the fewest number of signal types required.

2.2 System—Sensor Interface to Hydraulic Pump

As shown in FIGS. 1A and 2A, and 2C-2D, the system 100 includes an interface 120 between the sensor subsystem 110 and a hydraulic pump 5 of a hydraulic apparatus 10, where the interface 120 functions to provide a mechanism for robust physical coupling of the sensor subsystem 110 to the hydraulic pump 5. Additionally, the interface 120 is configured to facilitate rapid and efficient installation, such that the system 100 can be coupled universally to hydraulic system main pumps in a brand and equipment agnostic manner.

In variations, the interface 120 can couple the sensor subsystem 110 to the hydraulic pump 5 of the hydraulic apparatus 10, where the hydraulic pump 5 can be a hydraulic gear pump, a hydraulic piston pump, a hydraulic vane pump, or another suitable type of pump. In variations, the interface 120 couples the sensor subsystem 110 to the main output of the hydraulic pump 5, as shown in FIG. 1A; however, in other variations, the interface 120 can couple the sensor subsystem 110 to another suitable portion (e.g., inlet, valve position, etc.) of the hydraulic pump 5, in order to detect signals for downstream processing.

In the variations shown in FIGS. 1A and 2A-2D, the interface 120 comprises a housing 121, 121', which functions to provide at least a portion of a coupling mechanism between the sensor subsystem 110 (e.g., deformable member of a pressure sensor 112, thermocouple of a temperature sensor 114, turbine of a flow sensor 116, etc.) and the hydraulic pump 5 (e.g., at the main output). In the variation shown in FIGS. 2A-2D, the housing 121' includes a manifold or other channel 122' that provides coupling of the sensor subsystem 120 inline with and downstream of the main output of the hydraulic pump 5, in order to detect signals from flow through the hydraulic pump 5. As such, in this configuration, flow into the inlet of the channel 122 and through the outlet of the channel 122' of the housing 121' and interface 120 can produce rotation of a turbine of the flow sensor 116' for generation of flow-related signals, temperature sensing components of the temperature sensor 114' can interface (directly or indirectly) with fluid flowing through the housing 121' and interface 120 to generate temperature-related signals, and pressure sensing components of the pressure sensor 112' can interface (directly or indirectly) with fluid flowing through the housing 121' and interface 120 to generate pressure-related signals. In variations, one or more of the temperature sensor 114' and the pressure sensor 112' can directly or indirectly contact a surface of the channel 122'.

In order to provide a robust mechanism of coupling with the hydraulic pump 5, the housing 121 of the interface 120 can be composed of a material having suitable mechanical properties. In variations, materials of the housing 121 and/or other aspects of the interface 120 can be configured to provide suitable mechanical properties in relation to stresses attributed to flow through the interface (e.g., radial stresses, shear stresses, longitudinal stresses, tensile stresses, compressive stresses, stresses associated with pressure vessels; stresses associated with impacts to the system 110 and/or the hydraulic apparatus during use; stresses due to thermal expansion; stresses due to thermal contraction; and other associated stresses depending upon applications of use.

Additionally or alternatively, the housing 121 of the interface 120 can be composed of a material having suitable thermal properties. In variations, materials of the housing 121 and/or other aspects of the interface 120 can be configured to provide suitable thermal properties in relation to one or more of: thermal conductivity (e.g., in relation to allowing proper operation of the temperature sensor 114, in relation to insulative behavior), thermal expansion (e.g., in relation to having a desired level of thermal expansion); and other thermal properties depending upon application of use.

Additionally or alternatively, the housing 121 of the interface 120 can be composed of a material having suitable physical or surface properties. In variations, materials of the housing 121 and/or other aspects of the interface 120 can be configured to provide suitable physical or surface properties in relation to one or more of: electrochemical properties (e.g., due to corrosive environments), electromagnetic properties (e.g., in relation to ultraviolet light exposure), and other surface or physical properties due to environment of use of the system 100.

The housing 121 can also function to provide a seal about sensitive electronic and other components associated with the sensor subsystem 110 (e.g., such as the monitor 130 described in more detail below). In variations, the seal can be a hermetic seal, a seal that allows passage of gasses but prevents passage of liquids, or another suitable type of seal. In these variations, the housing 121 can function as a seal, or can additionally or alternatively include sealing components (e.g., gaskets, o-rings, sealing compounds, etc.) at openings of the housing 121, or between various sub-portions of the housing 121.

In specific examples, the housing 121 can be composed of a metallic material (e.g., aluminum), a metal-derived material, a ceramic material, a natural material, a synthetic material, or another suitable material. In other specific examples, the housing 121 can be composed of a polymeric material having suitable properties.

As described above, the interface 120 can also couple the sensor subsystem 110 to other portions of the hydraulic apparatus (e.g., in relation to mobile applications, in relation to industrial applications). In particular, the interface 120 can allow the pump demand sensor 118 to couple to a vehicle interface for monitoring engine RPM or other operational demand characteristics. In variations, the interface 120 can allow the sensor subsystem 110 to couple to a vehicle interface/CAN bus, with an associated protocol (e.g., J1939 protocol). However, other variations of the interface 120 can allow the sensor subsystem 110 to couple to another type of vehicle interface or other type of hydraulic apparatus interface, with another suitable protocol.

As noted above, the interface 120 can additionally or alternatively provide "contactless" coupling between the sensor subsystem 110 and portions of the hydraulic apparatus 10 (e.g., at the pump 5, away from the pump 5). In variations, the interface 120 can thus include architecture for enabling non-contact sensing between sensors of the sensor subsystem 110 and the hydraulic apparatus (e.g., at the main pump output), with architecture for wireless signal transmission between various system components. A variation of non-contact sensing can employ a clamp or other coupler that couples the non-contact sensors to the pump (e.g., near the main output, near another pump component, near another component of the hydraulic apparatus).

2.3 System—Monitor

As shown in FIG. 1A, the system 100 includes a monitor 130 coupled to the sensor subsystem 110 (e.g., through interface 120, proximal to interface 120, within the housing 121 associated with interface 120, etc.) and configured to receive outputs of the sensor subsystem 110 and to transmit data derived from outputs of the sensor subsystem 110 to components of the processing subsystem 140 described in more detail below. In more detail, the monitor 130 can include a controller (e.g., an embedded control module) that samples data generated from the sensor subsystem 110, logs the data, and transmits the data (e.g., over a wireless connection, over a wired connection) to the processing subsystem 140 described below.

In variations, the monitor 130 can be configured to receive analog signals from the sensor subsystem 110. Additionally or alternatively, the monitor 130 can be configured to receive digital signals (e.g., signals that are digitized from analog signals, etc.) from the sensor subsystem 110. As such, signals from the sensor subsystem 110 can be transmitted to the monitor 120 as analog signals, or alternatively as digital signals (e.g., digitized from analog signals, etc.), and the monitor 120 can accordingly process and transmit data derived from the signals to the processing subsystem 140.

In a variations, the monitor 130 can include computer architecture and circuitry for one or more of: connectors between various sensor and monitor 130 components (e.g., in relation to sensor inputs to the monitor 130), data storage, power source (e.g., battery, other power source), power management, and data transmission (e.g., via wireless communications, via wired communications, etc.). The monitor 130 can additionally or alternatively include architecture and circuitry for preconditioning of signals and/or data derived from the sensor subsystem 110 and/or other suitable functions. A specific example of the monitor 130 is described in Section 2.3.1 below.

2.3.1 Monitor—Specific Example

In a specific example, the monitor 130 includes an embedded controller comprising a computer comprising circuitry for interfacing with the sensor subsystem 110, with peripherals for debugging and wireless communication. In the specific example, the computer is an embedded single board computer of the monitor 130 that implements a Xilinx Zynq 7000 SoC and runs a Linux RT kernel. The Xilinx Zynq 7000's ARM processor (e.g., with processing logic) and FPGA (e.g., with programmable logic) can all be programmed and deployed using a suitable development environment.

In relation to sensor inputs from the sensor subsystem 110 and other inputs to the monitor 130, the monitor 130 of the specific example is configured to receive inputs associated with pressure, temperature, flow, pump demand, digital inputs, and auxiliary inputs. In relation to pressure, the monitor 130 receives an input 4-20 mA current signal and converts the current to a voltage using a high accuracy on-board shunt resistor. The voltage is sampled using an analog-to-digital converter (ADC), and the ADC sampling rate per channel is at least 10× the maximum update rate of the pressure sensor to allow for digital filtering. The ADC interface to the monitor 130 is via SPI or I2C protocol. In relation to temperature, the monitor 130 receives an input voltage derived from a thermocouple integrated circuit that communicates with the monitor 130 via SPI or I2C protocol. In relation to flow, the monitor 130 receives an input 30 mV-3V peak-to-peak sine wave with a frequency that is proportional to the flow rate, from the flow meter. The maximum frequency of the sine wave in the specific example is ~1000 Hz. The monitor samples the output from the magnetic pickup of the flow meter using an ADC with a sampling speed of at least 10 KHz. The monitor 130 then converts the analog sine wave into a digital square wave with equal frequency. In relation to pump demand, the monitor 130 measures engine RPM (e.g., for mobile fluid power applications) using a J1939 vehicle interface (e.g., with the CAN2.0 physical interface). The monitor 130 of the specific example has two built in CAN 2.0 controllers but requires a transceiver to translate the CAN voltage to 3.3 ttl voltage. The monitor of the specific example includes a CAN transceiver and routes the J1939 CAN interface to the computer (e.g., using suitable connectors).

In the specific example, the monitor 130 also includes two high speed industrial digital inputs. The industrial digital inputs can be used to monitor a pressure differential switch on a filter head to indicate when filter replacement is required. The industrial digital input can also be used to monitor a frequency input from a Hall Effect sensor used to measure hydraulic motor RPM. The monitor includes jumpers to configure the digital input as sourcing or sinking. In the specific example, the monitor 130 also includes 3 auxiliary 4-20 mA inputs. The monitor converts the current to a voltage using a high accuracy on-board shunt resistor. These inputs are intended to be used for monitoring 4-20 mA linear and angular position sensors connected to the hydraulic actuators in order to automate machine algorithm training, as described in more detail in relation to the processing subsystem and associated methods below.

As shown in FIGS. 2A-2D, in the specific example, the monitor 130 includes a single high density connector with dedicated inputs/outputs (I/O) for system peripherals and power supply couplings. The monitor 130 also includes a programming interface (e.g., USB interface) to program the computer and/or enable development functionality. The computer of the monitor 130 also includes a USB-to-Ethernet converter so the interface appears as an Ethernet network adapter with constant IP address on a separate host computer. The monitor 130 also includes a data storage module (e.g., uSD card connector for increased data storage). The controller of the monitor 130 uses the data storage module to log time series sensor data. The monitor 130 also includes an onboard battery (e.g., RTC (VBATT)) to power the real time clock of the computer. The battery is also used for the global navigation satellite system (GNSS) module to improve signal lock time for tracking and navigation purposes in mobile applications of the system.

In the specific example, the monitor 130 also includes a power management module that receives an input voltage (e.g., 9-36V DC input voltage) and conditions the input voltage to provide necessary voltages for other architecture of the monitor 130. In relation to mobile applications of use, the monitor includes circuitry to condition the input voltage to deal with over voltage scenarios, under voltage scenarios, reverse polarity protection, and transients that are common in mobile (e.g., automotive, terrestrial, other mobile) applications. In more detail, in mobile applications, the controller is powered from the vehicle battery bank (e.g., at 12 VDC/24 VDC). To avoid draining the vehicle battery while the engine is powered off, the power management module includes a power latching relay to remove power. The relay is triggered and latched by the vehicle ignition signal. Once the ignition switch is activated (e.g., vehicle is started) the power management module and associated controller will remain on until the latching relay is reset. The ignition signal is also monitored by the power management module and associated controller to determine when the vehicle of the mobile application has been turned off. When the ignition signal is no longer active and the data from the monitor 130 has been uploaded to the host server the power management module and associated controller shuts down and removes power by resetting the latching relay. In specific scenarios when the monitor 130 needs to remain powered on, the power management module implements a smart battery management system (SBMS) in the connection junction module. The SBMS charges while the vehicle is on and powers the control module when the vehicle is off. The SBMS communicates with the controller of the monitor 130 via CAN bus protocol to provide battery status. In order to maximize battery life, the controller of the monitor 130 goes into low power mode and periodically wakes up to monitor GPS location and transmit location and status to the host server.

In relation to data communication, the specific example of the monitor 130 achieves wireless communication using dedicated WiFi and cellular modems that interface to the computer (e.g., by UART connections). In the specific example, the radio antennas of the wireless communication components are external to the monitor and couple to the monitor 130 (e.g., by a 50 Ohm SMA connector). The monitor 130 also includes a dedicated GNSS module for monitoring position data by global satellite. The GNSS module interfaces to the computer (e.g., by via UART connections). In the specific example, the active GPS antenna is external to the monitor and couples to the monitor 130 (e.g., by a 50 Ohm SMA connector). In the specific example, the monitor is configured to not co-locate radios (e.g., Wifi radios, GPS radios, GPRS radios) within 20 cm of each other to avoid co-located radio classification.

2.3.2 Monitor—Use Cases

Figure 3:
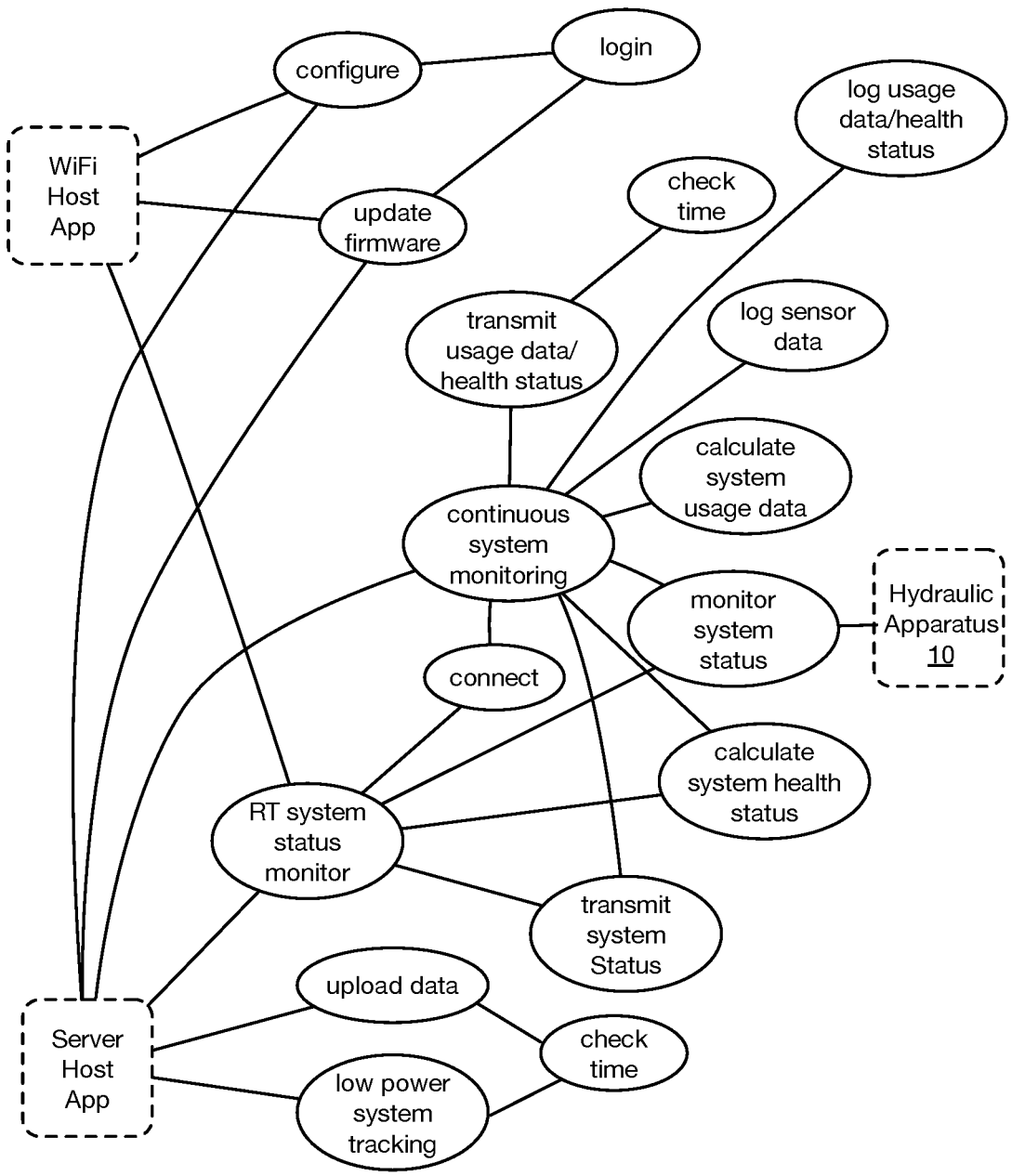
FIG. 3 depicts flow of various use cases associated with an embodiment of a system for hydraulic apparatus monitoring.

FIG. 3 depicts use cases associated with the monitor 130, with interfaces between a wireless communication (e.g., WiFi) host application, a server host application (e.g., associated with processing subsystem 140 described below), and the hydraulic apparatus 10 described above. In FIG. 3, the monitor 130 interfaces with the hydraulic apparatus 10 and logs sensor data from the sensor subsystem 110, with logging of hydraulic apparatus usage data for associated health status calculations. Filtering can be performed by monitor unit identifier, fleet identifier (e.g., associated with mobile applications of use), time stamp ranges, data identifiers, and data parameter value ranges. Health statuses can be associated with one or more of: pump efficiency, oil filter life, oil filter status, oil life remaining, relief valve setting, system temperatures, actuator efficiency, and other health statuses associated with various subcomponents of the hydraulic apparatus. In relation to health statuses, the monitor 130 and/or processing subsystem 140 described below can return notifications associated with maintenance event flags, pertaining to one or more of: filter replacement, oil replacement, component replacement, failure mode, and system status. System statuses can be associated with one or more of: high pressure (e.g., at 4-20 mA) operations, low pressure (e.g., at 4-20 mA) operations, pump flow, temperature, auxiliary position sensors, power management, pump demand, pump RPM, GPS operation, and other system statuses. Usage data can be associated with one or more of: cycle count, cycle time (e.g., average), route segment time (e.g., average), pump demand (e.g., average RPM), dry valve usage, GPS location, and other usage data.

The monitor also transmits pre-conditioned data, hydraulic apparatus usage data, and other system statuses over wireless communications for further processing. The monitor 130 also receives firmware updates and/or configurational aspects by way of the WiFi host application, and transmits data and power management information (e.g., related to low power operations) to the server host application. An example continuous monitoring mode, data transmission mode, low power mode, real-time system monitoring by server host application mode, real-time system monitoring by WiFi host application mode, configuration mode, and firmware update mode are described below:

In more detail, in continuous monitoring modes of operation, the monitor 130 interacts with the hydraulic apparatus 10 and the server host application, and with operation of the hydraulic apparatus 10, the monitor 130 monitors hydraulic apparatus 10 usage (e.g., at subcomponent and global levels), health statuses (e.g., at subcomponent and global levels), and other system statuses. The monitor 130 also logs receives and logs data from the sensor subsystem 110 related to one or more of pressure, temperature, flow, pump demand, filter status, and auxiliary inputs (e.g., for hydraulic actuator position). The monitor 130 also transmits data to the server host application by wireless communications, as described above (and buffers data with repeated transmission attempts if transmission is unsuccessful).

In more detail, in data transmission modes of operation, the monitor 130 interacts with the hydraulic apparatus 10 and the server host application. The monitor 130 verifies that time is within a suitable data transmission time window, and uploads data (e.g., time series sensor data) to the server by wireless communications, as described above. With confirmation of successful data transmission, the monitor 130 deletes locally stored data. The monitor 130 can transition to a low power mode of operation (described in the immediately following paragraph), and/or buffers data with repeated transmission attempts if transmission is unsuccessful).

In more detail, in low power modes of operation, the monitor 130 interacts with the hydraulic apparatus 10, the server host application, and an operator of the hydraulic apparatus 10. With successful data transmission to the server or a maximum number of unsuccessful data transmission attempts exceeded, the monitor 130 enters a low power mode of operation, periodically transmits status information to the server, and monitors battery status of the monitor 130. In the event that the monitor 130 enters a critical battery status, the monitor 130 powers off peripherals, resets a latching relay, and removes power from the controller of the monitor 130.

In more detail, in real-time system monitoring by server host application modes of operation, the monitor 130 interacts with the hydraulic apparatus 10 and the server host application. The server host application connects with the controller of the monitor 130, which streams data to the server host application. With processing, analyses (e.g., in relation to health statuses and other returned outputs) are presented to an operator of the hydraulic apparatus 10. In variations, the server host application can request to disconnect from the monitor 130, which closes the connection. In alternate flows, with connection initiation failure or connection disconnect failure, the server host application can attempt to connect or disconnect a threshold number of times.

In more detail, in real-time system monitoring by WiFi host application modes of operation, the monitor 130 interacts with the hydraulic apparatus 10 and the server host application. The WiFi host application connects with the controller of the monitor 130, which streams data to the server host application. With processing, analyses (e.g., in relation to health statuses and other returned outputs) are presented to an operator of the hydraulic apparatus 10. In variations, the server host application can request to disconnect from the monitor 130, which closes the connection. In alternate flows, with connection initiation failure or connection disconnect failure, the server host application can attempt to connect or disconnect a threshold number of times.

In configuration modes of operation, the monitor 130 interacts with the server host application and the hydraulic apparatus 10, for configuration adjustments.

In firmware update modes of operation, the monitor 130 interacts with the server host application and the hydraulic apparatus 10, to receive firmware updates.

2.4 System—Processing Components

As shown in FIG. 1A, the system includes a processing subsystem 140 operatively coupled to the monitor 130 and/or sensor subsystem 110 and including non-transitory computer-readable media storing instructions that, when executed by the processing subsystem 140, perform operations for identifying, from outputs of the monitor 130, a set of unique signatures corresponding to states and events of the hydraulic apparatus 10. The processing subsystem 140 thus functions to generate analysis (e.g., related to hydraulic apparatus and subcomponent statuses and events) derived from signals of the sensor subsystem 110, and to facilitate execution of response actions to improve or maintain hydraulic apparatus performance. In relation to generation of analyses, the processing subsystem 140 can also function to generate and process training and test datasets for development and refinement of machine learning (ML) models, where the ML models return outputs associated with hydraulic apparatus and subcomponent statuses and events from received sensor data.

The processing subsystem 140 can include one or more processing subsystems implemented in one or more of: a remote server, a personal computer, a cloud-based computing system (e.g., Zeek™ platform, Amazon™ Web Services (AWS) platform, etc.), a computing module of a mobile electronic device (e.g., mobile communication device, wearable computing device, etc.), and any other suitable computing device. The processing subsystem 140 can communicate with other system components (e.g., monitor 130) and/or third party systems over a network 150, in relation to data transfer or other operations (e.g., some of which are described above). Furthermore, architecture of the processing subsystem 140 can overlap with that of the monitor 130, and/or be physically distinct from that of the monitor. For instance, in one variation, some components of the processing subsystem 140 can be on-board the monitor 130, and/or some components of the processing subsystem 140 can be distinct and implemented in the cloud and/or computing systems remote from the monitor 130.

In more detail, the network 150 functions to enable data transmission between system components and/or third party platforms. The network 150 can include a combination of one or more of local area networks and wide area networks, and/or can include wired and/or wireless connections to the network 150. The network 150 can implement communication linking technologies including one or more of: 802.11 architecture (e.g., Wi-Fi, etc.), 3G architecture, 4G architecture, 5G architecture, Ethernet, worldwide interoperability for microwave access (WiMAX), long term evolution (LTE) architecture, code division multiple access (CDMA) systems, digital subscriber line (DSL) architecture, and any other suitable technologies for data transmission.

In variations, the network 150 can be configured for implementation of networking protocols and/or formats including one or more of: hypertext transport protocol (HTTP), multiprotocol label switching (MPLS), transmission control protocol/Internet protocol (TCP/IP), file transfer protocol (FTP), simple mail transfer protocol (SMTP), hypertext markup language (HTML), extensive markup language (XML), and any other suitable protocol/format. The network 150 can also be configured for and/or provide, through communication links, encryption protocols for improving security of data transmitted over the network 150.

As noted above, the processing subsystem 140 is configured to perform operations for identifying, from outputs of the monitor 130, a set of unique signatures corresponding to states and events of the hydraulic apparatus 10. In variations, the operations can involve processes associated with one or more of: receiving a set of data streams, derived from outputs of the sensor subsystem 110, from the monitor 130; performing a set of transformation operations upon the set of data streams, wherein the set of transformation operations includes a disaggregation operation; identifying a set of unique signatures corresponding to states and events of the hydraulic apparatus 10 and subcomponents of the hydraulic apparatus 10, from the set of transformation operations; returning an analysis including a recommended action for improving or maintaining proper performance of the hydraulic apparatus, based upon the set of unique signatures; and optionally, executing the recommended action.

One or more operations executed in coordination with the processing subsystem 140 can implement ML models (e.g., classifiers) refined with training data generated by the system 100 and/or other systems, as described in relation to the method 300 below. Details of the operations are further described in relation to embodiments, variations, and examples of the method 300 of Section 3 below.

3. Method

Figure 4:
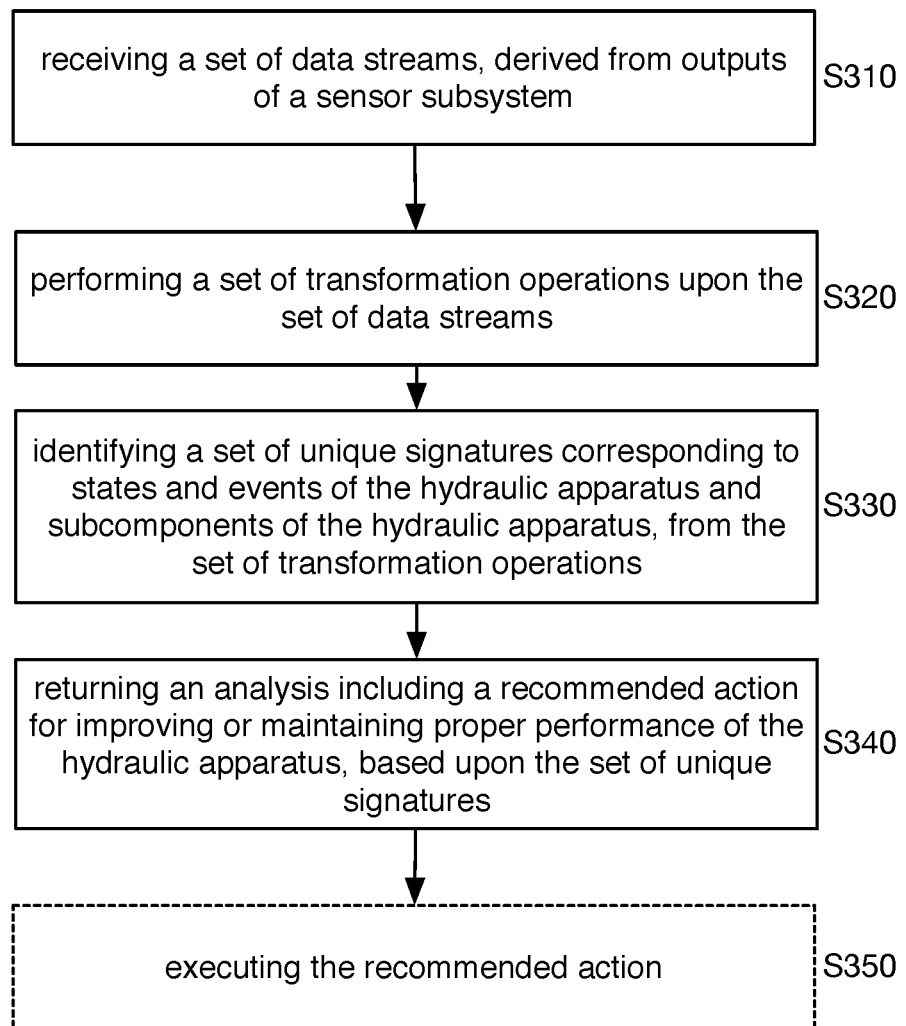
FIG. 4 depicts an embodiment of a method for hydraulic apparatus monitoring.

As shown in FIG. 4, an embodiment of a method 300 for evaluating hydraulic apparatus events includes: receiving a set of data streams, derived from outputs of a sensor subsystem S310; performing a set of transformation operations upon the set of data streams S320, wherein the set of transformation operations includes a disaggregation operation; identifying a set of unique signatures corresponding to states and events of the hydraulic apparatus and subcomponents of the hydraulic apparatus, from the set of transformation operations S330; returning an analysis including a recommended action for improving or maintaining proper performance of the hydraulic apparatus, based upon the set of unique signatures S340; and optionally, executing the recommended action S350.

The method 300 functions to provide improved tools for monitoring, forecasting, and troubleshooting events (e.g., failure modes, lifespans, etc.) of hydraulic apparatus components at global and subcomponent levels. In particular, in applications involving monitoring of hydraulic apparatuses used for mobile applications (e.g., in relation to vehicle-mounted hydraulic systems, in association with excavators, in association with oil rig drilling apparatuses, in association with cement trucks, in association with garbage trucks, etc.) and/or in other industrial applications (e.g., injection molding machines, overhead cranes, etc.), the system 100 can enable assessments of hydraulic apparatus health and other anticipated events at subcomponent and global levels, in an improved manner. Subcomponents monitored according to the method 300 can be upstream of the hydraulic pump, downstream of the hydraulic pump, and/or associated with the hydraulic pump, and in examples, can include any one or more of: valve components, pump oil, piston components, motor components, or other suitable hydraulic apparatus subcomponents. The method 300 can also generate usage information from signals processed, at global and subcomponent levels of abstraction.

Such inventions associated with the method 300 thus prevent unexpected and unplanned maintenance events which have significant associated costs, thereby improving hydraulic system performance and/or allow hydraulic systems to have extended lifespans of use. Additionally, the method 300 can provide steps for analyzing individual subcomponents of hydraulic equipment with a single set of sensors coupled to the hydraulic equipment at a single position, thereby providing operators with information pertaining to operating life, health, remaining life, and/or other statuses of individual subcomponents in a manner that is significantly more efficient and lower in cost. In particular, signals generated by the set of sensors can be used to assess statuses and events upstream and/or downstream of the position of coupling between the sensors and the hydraulic apparatus in a manner that has not previously been achieved. Furthermore, the method 300 rapidly process signal streams, with disaggregation of multiple signal types to extract insights related to hydraulic apparatus statuses and events.

In specific examples, the method 300 provides innovation in advanced sensor system design and machine learning approaches, in fields using hydraulic systems, to provide a plug-and-play, real time monitoring and predictive maintenance solution in a cost-effective manner. In particular, the method 300 can monitor a reduced number of system parameters and transmit data for processing (e.g., at least in part in cloud computing systems) to determine health statuses of the associated hydraulic systems, at the component level, in real time. Hydraulic system statuses and actionable alerts are the provided by the method 300 to the user (e.g., using a customer portal), to enable them to streamline their equipment maintenance procedures and prevent downtime.

In embodiments, the method 300 can be implemented, at least in part, by system 100 elements described in Section 2 above. However, the method 300 can additionally or alternatively be implemented by other suitable systems/system components.

Further details of components of the method 300 are described in the following sections.

3.1 Method—Signal Acquisition

As shown in FIG. 4, Block S310 recites: receiving a set of data streams, derived from outputs of a sensor subsystem. Block S310 functions to monitor a discrete (e.g., minimized) set of signal types and/or number of a parameters, from which performance of the hydraulic apparatus and/or demand on the hydraulic apparatus can be extracted. The data derived from the signals can then be processed according to methods described in more detail below, in order to efficiently assess statuses of and/or anticipate events of the hydraulic apparatus and its subcomponents.

As described in relation to the system above, Block S310 can include establishing an interface between the set of sensors and the hydraulic apparatus (e.g., as described above). As such, the set of data streams can correspond to sensors of the set of sensors described above, wherein, in embodiments, the set of sensors can include: a pressure sensor, a temperature sensor, a flow sensor, and a pump demand sensor. The set of data streams can, however, correspond to other signal types and/or signals of the same type, but from sensors not described above.

In relation to receiving the set of data streams, one or more of an embodiment of the monitor and the processing subsystem described above can receive the set of data streams over a wireless or wired connection, using any suitable transmission protocol.

Figure 5:
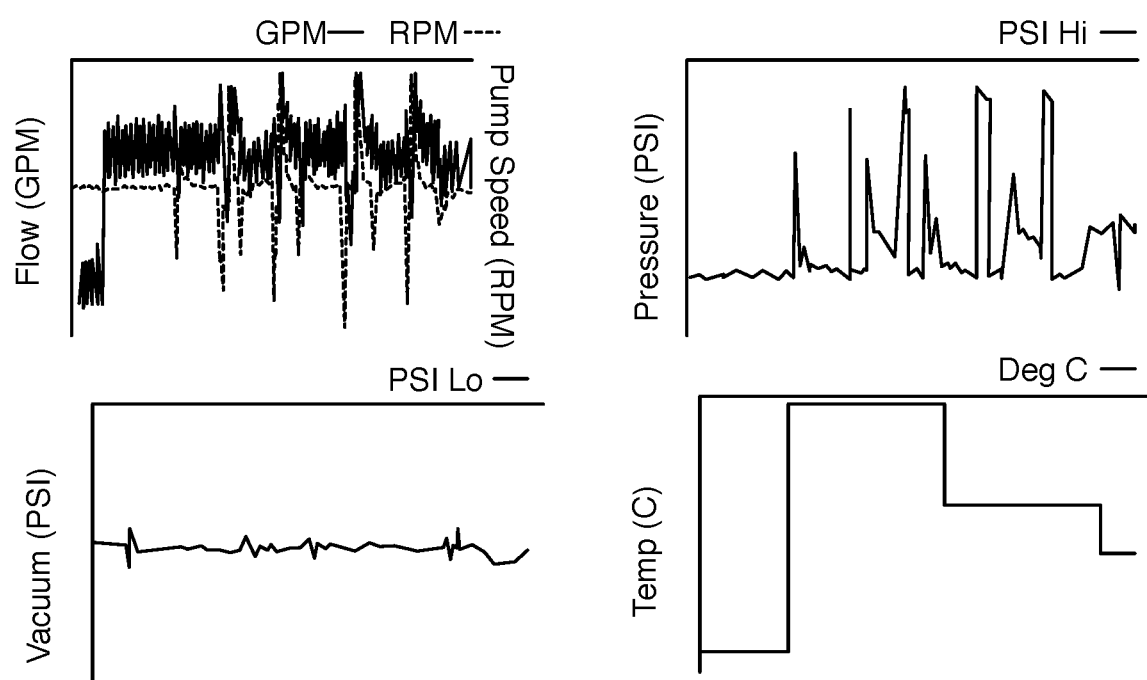
FIG. 5 depicts example signal streams associated with a first scenario of use of a hydraulic apparatus.

FIG. 5 depicts example signal streams corresponding to hydraulic fluid flow rate (e.g., in gallons per minute), pump demand (e.g., in terms of pump revolutions per minute, RPM), hydraulic fluid pressure (e.g., in pounds per square inch, PSI), vacuum pressure (e.g., in pounds per square inch, PSI), and hydraulic fluid temperature (e.g., in degrees Celsius) for a first window of time corresponding to usage of the hydraulic apparatus in a first scenario (e.g., of a mobile application).

Figure 6:
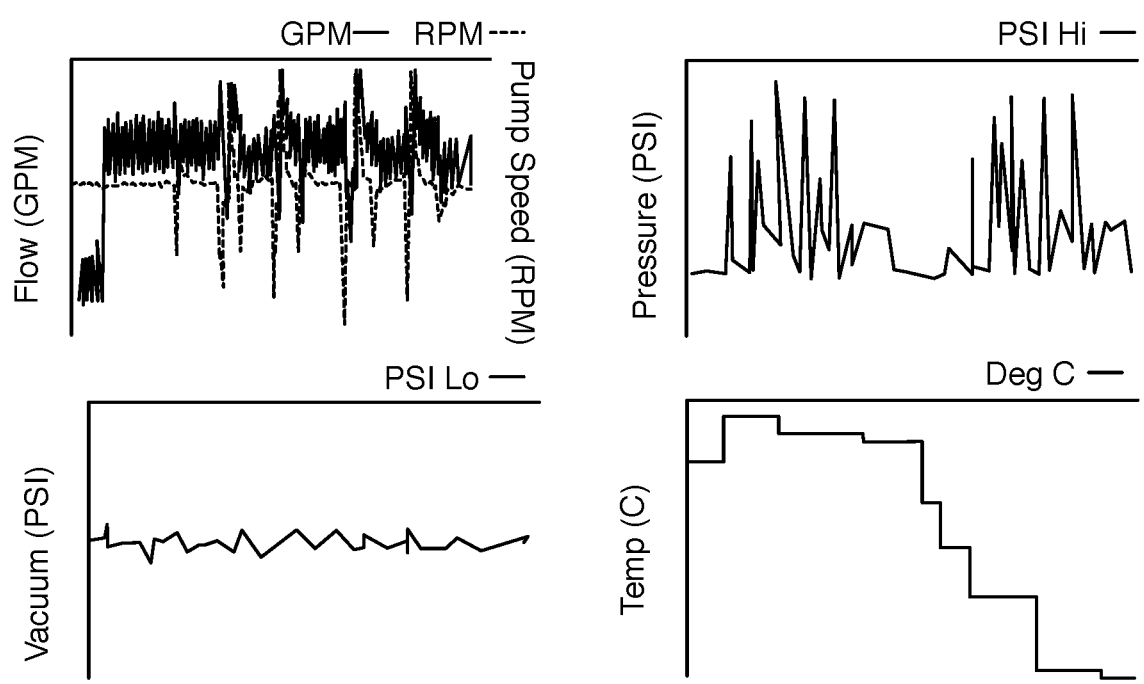
FIG. 6 depicts example signal streams associated with a second scenario of use of a hydraulic apparatus.

FIG. 6 depicts example signal streams corresponding to hydraulic fluid flow rate (e.g., in gallons per minute), pump demand (e.g., in terms of pump revolutions per minute, RPM), hydraulic fluid pressure (e.g., in pounds per square inch, PSI), vacuum pressure (e.g., in pounds per square inch, PSI), and hydraulic fluid temperature (e.g., in degrees Celsius) for a first window of time corresponding to usage of the hydraulic apparatus in a second scenario (e.g., of a mobile application).

Figure 7:
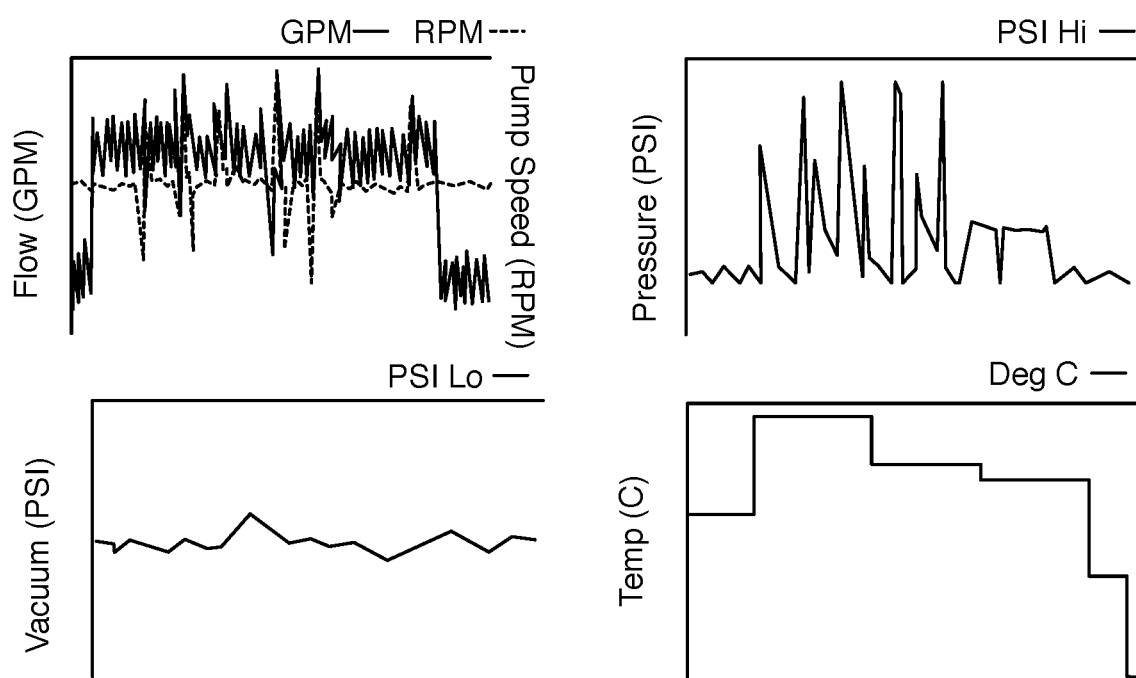
FIG. 7 depicts example signal streams associated with a third scenario of use of a hydraulic apparatus.

FIG. 7 depicts example signal streams corresponding to hydraulic fluid flow rate (e.g., in gallons per minute), pump demand (e.g., in terms of pump revolutions per minute, RPM), hydraulic fluid pressure (e.g., in pounds per square inch, PSI), vacuum pressure (e.g., in pounds per square inch, PSI), and hydraulic fluid temperature (e.g., in degrees Celsius) for a first window of time corresponding to usage of the hydraulic apparatus in a third scenario (e.g., of a mobile application).

Variations of signal streams can, however, include data outputs having units other than those depicted in the FIGURES, and/or can include derivative parameters or parameters correlating with those described and depicted.

3.2 Method—Extracting Signatures Associated With Statuses and/or Events

Block S320 recites: performing a set of transformation operations upon the set of data streams. The set of transformation operations function to receive, as inputs, the data streams of Block S310 in order enable extraction of signatures corresponding to events (e.g., historical events, anticipated events, usage, etc.) and/or statuses (e.g., health statuses) of the hydraulic apparatus (e.g., at global and subcomponent levels) in Block S330. As such, processing the inputs in S320 allows for returning of classified event outputs in Block S330, with generation of analyses in Block S340 below. The set of transformation operations can additionally or alternatively function to condition, clean, or otherwise generate derivative data types or objects to facilitate performance of subsequent method steps.

In relation to performing the set of transformation operations, an embodiment of the processing subsystem described above can receive the set of data streams of Block S310 over a wireless or wired connection, using any suitable transmission protocol. Receiving the set of data streams and performing the set of transformation operations can be performed real-time (e.g., with information transfer without significant delay from the time of initial signal generation, thereby enabling rapid responses). Additionally or alternatively, receiving the set of data streams and performing the set of transformation operations can be performed non-real time (e.g., with post-processing delay).

As noted above, the set of transformation operations can include a disaggregation operation that implements artificial intelligence (AI) neural networks (NN) models, to ultimately identify signal/data subsets and unique signatures corresponding to events/statuses of individual subcomponents of the hydraulic apparatus. In embodiments, the processing subsystem described above can run a single NN or a series of NN trained to identify and classify hydraulic apparatus events (e.g., historical events, anticipated events, etc.), subcomponent and global statuses, and any variations. As such, the set of transformation operations can take, as inputs, data derived from the signal streams and process them with trained AI/NN models for returning unique signatures in Block S330.

Classification of events and statuses can further be based upon various modalities (e.g., use cases) of subcomponents of the hydraulic apparatus. For instance, subcomponents may have different modalities such as a cylinder under high load or a motor under varying load. These modalities can be classified as unique and are trained and identified separately by the AI/NN, for later recombination based upon the data and device organizational framework for event and usage aggregation and analysis.

More detail regarding data, features, and training of models is described in 3.2.1 below.

The set of transformation operations can additionally or alternatively include operations associated with signal conditioning, noise removal, artifact mitigation, calibration, or other signal processing operations. Such operations can ensure signal stream quality prior to further processing in various method steps. In some variations, preprocessing the signal streams can include performing one or more steps to verify completeness of data (e.g., no lapse in the signal streams).

In relation to other transformation operations (e.g., after performance of a preprocessing operation), Block S320 can include one or more of: denoising, filtering, smoothing, clipping, transformation of discrete data points to continuous functions, and performing any other suitable data conditioning process. For instance, some variations of Block S320 can additionally include performing a windowing operation and/or performing a signal cleaning operation. In more detail, windowing can include any one or more of moving windows, exponentially weighted moving windows (EWMW), moving Gaussian methods, and any other suitable window filtering method.

In more detail, signal cleaning can include removal of signal anomalies by one or more filtering techniques. In specific examples, filtering can include one or more of: Kalman filtering techniques, bootstrap filtering techniques, particle filtering techniques, Markov Chain Monte Carlo filtering techniques; metropolis-Hasting methods; approximations (e.g., Laplace approximations); and/or other signal processing approaches. Signal cleaning can thus improve data quality for further processing, in relation to one or more of: noise, sensor equilibration, sensor drift, environmental effects (e.g., moisture, physical disturbance, etc.), and any other suitable type of signal artifact.

Transformation of discrete data points into a continuous function, can include performing an interpolation operation including one or more of: a spline (e.g., a b-spline interpolation), a Bessel function interpolation, a path integral operation (e.g., a Feynman-Kac path integral operation), and any other suitable interpolation operation. The interpolation operation can thus support a wavelet approximation operation, which requires a continuous function. The wavelet approximation operation can functions to provide further smoothing and detrending of data from the sensor subsystem without distorting the underlying signal or introducing a time lag component. In variations, the wavelet basis functions can include any one or more of: Daubechies wavelets, Dual-Tree Complex wavelets, Haar wavelets, Newland wavelets, and any other suitable wavelet basis function(s). Furthermore, in variations, the wavelet analysis can implement a continuous wavelet transform that can construct a time-frequency representation of a signal.

Block S320 can additionally or alternatively include any other suitable signal processing operation.

Block S330 recites: identifying a set of unique signatures corresponding to states and events of the hydraulic apparatus and subcomponents of the hydraulic apparatus, from the set of transformation operations, which functions to process input data streams and/or derivative data, in order to properly classify signatures associated with events and statuses of the hydraulic apparatus. Block S330 can thus execute steps for unique signature identification associated with hydraulic apparatus subcomponents, through event detection and classification methods. Once disaggregated, the individual subcomponents of the hydraulic apparatus are then evaluated based upon a refined model that processes input data to determine analyses related to subcomponent events and statuses. For instance, in a specific example, Block S320 can identify a unique signature corresponding to one or more of: a leak in a cylinder or other component of the hydraulic apparatus, a blockage in a flow path of the hydraulic apparatus, a filter that is near its useful life, piston events, valve events, hydraulic fluid statuses (e.g., useful life, pressure events, temperature events, etc.) based on the disaggregated signature associated with sensor measurement trends and/or historical measurements (e.g., stored by the system).

Unique signatures can be identified in relation to normal operation of subcomponents, failed operation (e.g., leaking) of subcomponents, or borderline operation (e.g., near failure) of subcomponents. Unique signatures can additionally or alternatively be identified in relation to baseline behavior of a subcomponent (e.g., for normalization, for comparative measures). Additionally or alternatively, unique signatures can be identified based upon calibrated measurements generated from subjecting the hydraulic apparatus to calibration loads, and detecting signals from the sensor subsystem. Additionally or alternatively, unique signatures can be identified for identified subcomponents (e.g., of an aggregated list) or unidentified subcomponents (e.g., ambiguous components) not included in an aggregated list. Downstream processing steps can thus train models for characterization of the unidentified subcomponents in order to increase utility of the method 300.

In relation to identifying a set of unique device signatures for the hydraulic apparatus and/or subcomponents, based upon outputs of the disaggregation process, the processing subsystem can determine if the hydraulic event is a known event and then begin classifying the resulting signature and device performance against trends. Additionally or alternatively, the processing subsystem can flag unknown events for analysis, and perform model refinement operations based upon new training data, as described in more detail below.

3.2.1 Method—Signal Processing and Machine Learning Approaches

In relation to identification of unique signatures corresponding to events and/or statuses of the hydraulic apparatus, the processing subsystem described above can implement architecture for classification and regression, with training of models by processing suitable training datasets. In particular, the unique characteristics of each event and status of the hydraulic apparatus are not practically detectable in the mind, and are instead learned by the machine learning architecture in relation to Blocks S320-S340 of the method 300.

To refine the model(s), the method 300 can include generating one or more training sets of data, from the sensor subsystem and/or other sensors, in order to train the AI/NN model(s) in or more stages of training, to identify unique signatures from various inputs. In variations, generating training sets of data can include generating sensor data (e.g., from the main pump output), from scenarios for each subcomponent type of the hydraulic apparatus and/or other hydraulic apparatuses, tagged with associated system events, statuses (e.g., health statuses), and performance. Training sets of data can include collected sensor data, modified sensor data (e.g., according to transformation operations), unmodified sensor data, data objects produced from disaggregation, and/or other suitable data. As such, the method can include: collecting a set of training data streams from the sensor cluster, the set of training data streams corresponding to temperature data, pressure data, flow data, and pump demand data in association with subcomponent events and statuses of the hydraulic apparatus; applying one or more of a set of transformation operations to the set of training data streams; creating a training dataset derived from the set of training data streams and the set of transformation operations; and training a neural network comprising architecture for returning at least one of the set of unique signatures and the analysis, in one or more stages, based upon the using the training dataset. Additional details are provided below.

For instance, in relation to generation of training datasets, the method can include generating mappings between disaggregated data (e.g., data processed to extract features only associated with a particular subcomponent, such as a cylinder, valve, piston, pump, filter, case, hydraulic fluid, or other subcomponent) and raw input data that has not been processed with a disaggregation operation. As such, training data can be developed based upon the disaggregated data and/or non-disaggregated data (in multiple stages). In relation to multiple stages of training, the method 300 can refine models based upon incorrect classification of disaggregated and/or non-disaggregated data.

Data and/or features derived from the data can be used for training models for unique signature extraction. Furthermore, combinatorial features (e.g., combinations features derived from one or more of pressure, vacuum, temperature, flow, pump demand, etc.) can be used for training. In more detail, features may be transformed either individually or in combination before being processed by the model(s). As an example of an individual feature transformation, a features derived from a Fourier transform of a cyclic pressure measurement might be used instead of or in addition to the pressure measurement itself. As an example, a combinatorial feature can be derived from synchronous temperature and pressure features (e.g., where occurrence together is a feature).

Additionally or alternatively, dynamic aspects (e.g., changes over time in features, changes in frequency between instances of respective features, other temporal aspects, other frequency-related aspects, etc.) of signatures/features derived from the signals can be used to extract information pertaining to hydraulic equipment states (e.g., in relation to system wear, in relation to subcomponent wear, etc.) in order to predict or otherwise anticipate failure events. As such, models can be implemented to prevent failure by guiding or executing actions to prevent root causes of failure and/or break chains of events that could lead to a cascade of subcomponent failures.

As such, data and/or features that are labeled by hydraulic apparatus subcomponent type and one or more of event type (e.g., in relation to hydraulic apparatus events/issues/failure modes) and/or other status (e.g., health status, lifetime of use, etc.) can be used for training models to return outputs pertaining to unique signatures of the hydraulic apparatus and its subcomponents. In some embodiments, labeling can be performed automatically, semi-automatically, or manually. Automated or semi-automatic labeling may be validated or adjusted by manual feedback (e.g., during model refinement). Architecture of the models can include involvement of one or more of: neural networks, self-organizing maps, support vector machines, decision trees, random forests, and Gaussian mixture models.

In more detail, data features from which hydraulic apparatus information can be extracted can include one or more of: changes in the values of electrical signals associated with the sensor types (e.g., which map to changes in one or more of pressure, flow, vacuum, temperature, pump demand, etc.), where changes can be compared to threshold levels or time rates of change (e.g., in relation to transient events, in relation to non-transient events, etc.); power monitoring signals (e.g., generated according to the set of transformation operations) corresponding to a measurement of one or more of the temperature, pump flow, demanded flow and pressure delivered to the hydraulic apparatus; peak values of electrical signals associated with the sensor types (e.g., which map to peaks in one or more of pressure, flow, vacuum, temperature, pump demand, etc.), where peaks can be compared to threshold levels or correlations with other signals or events within a time window (e.g., in relation to expected correlations between sensor parameters, in relation to unexpected correlations between sensor parameters, etc.); signal profiles (e.g., in relation to values in the time or frequency domain); cyclic features (e.g., in relation to oscillation); noise-associated features (e.g., expected noise profiles as features for classification); short term events (e.g., events characterized by a threshold window size); long term events (e.g., events characterized by a threshold window size); events in the time domain; events in the frequency domain; features related to repeated signatures; normalized features (e.g., features compared to steady state or reference state data); comparative features (e.g., average, median, maximum, minimum, or logarithmic values) within a time period; aspects related to feature onset; aspects related to feature termination; change in real or imaginary components of a spectrum (e.g., in relation to multiple harmonics); Fourier or other transform-derived features; features derived from a phase shift; features associated with variability of a signal within a time window; harmonic values; total magnitude of harmonic values; harmonic values relative to total magnitude of harmonics; and other features. These features may be computed from any of the sensor signals described above (e.g., current, voltage, and other electrical signals).

Furthermore, aggregated events can be evaluated (e.g., in the time domain) in relation to feature extraction and processing. For instance, in some, operations can span a longer time window (e.g., during a dumpster pickup cycle), and include many individual and successive events that can be evaluated.

An example of a model for feature generation and/or classification is a transition/state classification model that describes changes in state of the hydraulic apparatus or a subcomponent of the hydraulic apparatus. To capture changes to elements of a device, the transition model may be created for elements of the hydraulic apparatus that can change state (e.g., in a hierarchical manner). The processing subsystem can implement transition models for classes of hydraulic apparatuses and/or subcomponents (e.g., hydraulic fluid, pump inlet, pump outlet, piston, valves, case, downstream elements from the main output, upstream elements from the main output, etc.). In particular, the transition model can be configured to return a state change output associated with one or more subcomponents of the set of subcomponents. Transition models may further be implemented for classes of system components or subcomponents (e.g., by manufacturer, by pump type, by hydraulic fluid type, by filter type, etc.). Transition models can further be implemented for a specific device (e.g., specific pump model, specific excavator, specific cement truck, specific garbage truck, specific injection molding machine, etc.).

In addition to transition models, the processing subsystem can implement and include architecture for other, non-transition models not associated with state changes. For instance, a noise model can be used by the processing subsystem to recognize portions of sensor signals that correspond to noise behavior, in order to facilitate feature extraction.

Another example of a model is a subcomponent operational model that describes sequential changes to the operation of an apparatus. In some variations, a graph (weighted or unweighted) may be used for the subcomponent operational model, where the graph can incorporate nodes corresponding to subcomponent states, with allowance or non-allowance of loops that return to a respective node or a different node. In an example, for lifting of a drum of a cement truck can increase demand upon a pump of the hydraulic apparatus, where initiation of the lifting operation can define a node of a graph. One or more of pressure, temperature, flow, and pump demand may increase throughout the lifting operation, which is represented in signal features associated with events and non-identical demand profiles on different components of the hydraulic apparatus. Then, with return of the drum of the cement truck to a baseline state, one or more of pressure, temperature, flow, and pump demand may decrease, thereby allowing cyclic return to the node of the graph. In other examples, states of subcomponents may not allow returns after transitions from the state, which can be represented in the graph model.

In another variation, the processing subsystem can additionally or alternatively implement architecture for models that represent likelihoods that the hydraulic apparatus and/or its subcomponents can enter a particular state given known information (e.g., demand, environmental conditions, anticipated mission for mobile hydraulic apparatus; anticipate operation mode for industrial hydraulic apparatus, etc.). Such likelihood models can be trained as described.

In relation to model architecture, inputs to models described above can produce outputs that are subsequently used as inputs to an overarching model (e.g., search graph) that returns a final classification output based upon processing features in stages (e.g., running features through nodes of the search graph). However, the model(s) can implement other suitable architecture having other suitable flow for processing features.

In an example, the methods and systems for disaggregation can implement a recurrent neural network (RNN) architecture with connections between nodes to form a directed graph along a temporal sequence, thereby characterizing temporal dynamic behavior. The RNN can be bi-directional or of any suitable number of directions, with one or more encoders, separators, and decoders. The RNN architecture can process variable length sequences of inputs, thereby processing the signal streams and/or derived features above. The RNN can implement long short-term memory (LSTM) architecture with feedback connections for processing data sequences. The LSTM unit(s) of the RNN model can include cells, input gates, output gates, and/or forget gates to regulate information flow into and out of the cell. As such, the LSTM RNN architecture can classify, process, and make predictions based on input features derived from the signals described above. Connections into and out of the LSTM gate(s) can be recurrent or non-recurrent, and weights of connections can be refined during training to determine how the gates operate in providing better outputs. Training can implement supervised training approaches (e.g., using an optimization algorithm, using a connectionist temporal classification approach, using neuroevolution, using policy gradient approaches, etc.).

In one variation, the disaggregation model can include multiple sub-models, where each sub-model corresponds to a number of input components associated with the events being processed. The disaggregation model can be configured to implement the appropriate sub-model based upon prior knowledge of the number of subcomponents of the hydraulic apparatus being analyzed, or alternatively, can be configured to automatically detect the number of subcomponents of the hydraulic apparatus being analyzed with an estimation algorithm applied to the signal streams. Such an approach can provide an alternative to use of masks for disaggregation, where the masks may not be well-defined and/or contribute to information loss during application of the disaggregation model. In this variation, the disaggregation model can be optimized based upon signal-to-noise ratio (SNR)-associated parameters (e.g., a scale-invariant SNR), using one or more loss functions and permutation-invariant training. In one variation of model architecture, a loss function with suitable loss terms can be inserted adjacent to each separation block of the disaggregation model in order to improve optimization of the disaggregation model. The model can additionally or alternatively include a perceptual loss function to encourage consistent mapping of subcomponents and/or subcomponent-associated events. Other approaches (e.g., RNN approaches derived from one or more of ADANet, DPCL++, CBLDNN_GAT, TasNet, DPRNN, ConvTasNet, etc.) and training methods can be implemented, as described below.

Returned classification outputs of models can include returned confidence-associated parameters in such classifications. In particular, confidence-associated parameters can have a score (e.g., percentile, other score) that indicates confidence in the returned output.

Models can be developed and trained for real-time analyses and/or historical analyses. In relation to real-time analyses, the models can be refined for rapid classification (e.g., with node reduction, with reduced thresholds, with lower confidence, etc.). In relation to historical analyses, the models can be refined for detailed classification (e.g., without node reduction, with higher thresholds for classification predictions, with higher confidence, etc.).

In relation to returned outputs of the model(s) corresponding to unique signatures of subcomponents of the hydraulic apparatus, outputs and signatures can be associated with one or more of: the hydraulic fluid (e.g., lifetime of use, contamination, leakage, etc.); fluid conduits (e.g., heat aging, abrasion, hardening, cracking, blockage, etc.); pump (e.g., piston states, valve states, case drain states, cylinder states, states of leakage, states of wear, cavitation events, etc.); actuators; filter (e.g., filter lifetime of use, filter clogging, etc.); motors (e.g., electrical aspects, mechanical aspects); valves (e.g., valve operation, valve-line connections, etc.); and other signatures associated with states of subcomponents.

Figure 8:
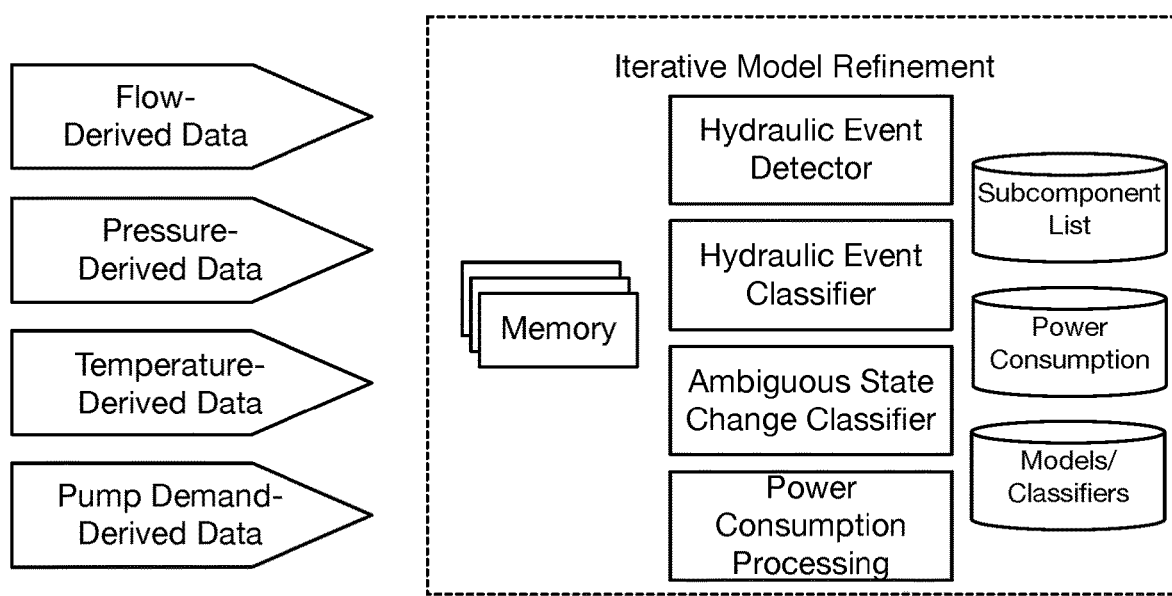
FIG. 8 depicts example model architecture associated with an embodiment of a method for hydraulic apparatus monitoring.

In an example, as shown in FIG. 8, model refinement for known/identified and/or unknown ambiguous components can be performed as follows: the processing subsystem can compute, from signal streams, a measure of power consumption and evaluate aggregate and individual pressure, flow and time parameters for a sequence of time intervals for each identified subcomponent of a set of identified subcomponents using the list of identified devices and one or more models (e.g., event classifiers, event detectors, etc.); the processing subsystem can also compute an amount of power consumption and/or change in power consumption for the sequence of time intervals for each category of the plurality of categories using a list of ambiguous subcomponents built during model refinement; and train the model to output power consumption parameters for individual subcomponents, based upon input features/data.

Furthermore, previously unidentified signal features/signatures (e.g., new signals/signatures, interesting signals/signatures, etc.) can be returned by computing components during model refinement. In variations, such previously unidentified signal features/signatures can be processed and validated (e.g., with human validation, with other validation approaches), and once validated, the computing components can tag such signal features/signatures, such that additional instances of the signal features/signatures can be processed from other hydraulic equipment units for further model refinement and training.

While embodiments, variations, and examples of models (e.g., in relation to inputs, outputs, and training) are described above, models associated with the method 300 can additionally or alternatively include other blocks for statistical analysis of data and/or machine learning architecture.

Statistical analyses and/or machine learning algorithm(s) can be characterized by a learning style including any one or more of: supervised learning (e.g., using back propagation neural networks), unsupervised learning (e.g., K-means clustering), semi-supervised learning, reinforcement learning (e.g., using a Q-learning algorithm, using temporal difference learning, etc.), and any other suitable learning style.

Furthermore, any algorithm(s) can implement any one or more of: a regression algorithm, an instance-based method (e.g., k-nearest neighbor, learning vector quantization, self-organizing map, etc.), a regularization method, a decision tree learning method (e.g., classification and regression tree, chi-squared approach, random forest approach, multivariate adaptive approach, gradient boosting machine approach, etc.), a Bayesian method (e.g., naïve Bayes, Bayesian belief network, etc.), a kernel method (e.g., a support vector machine, a linear discriminate analysis, etc.), a clustering method (e.g., k-means clustering), an associated rule learning algorithm (e.g., an Apriori algorithm), an artificial neural network model (e.g., a back-propagation method, a Hopfield network method, a learning vector quantization method, etc.), a deep learning algorithm (e.g., a Boltzmann machine, a convolution network method, a stacked auto-encoder method, etc.), a dimensionality reduction method (e.g., principal component analysis, partial least squares regression, etc.), an ensemble method (e.g., boosting, boot strapped aggregation, gradient boosting machine approach, etc.), and any suitable form of algorithm.

3.3 Method—Actionable Insights and Downstream Applications

Block S340 recites: returning an analysis including a recommended action for improving or maintaining proper performance of the hydraulic apparatus, based upon the set of unique signatures. Block S340 functions to process any returned signatures from prior steps, to generate analyses pertaining to health of the hydraulic apparatus, efficacy of operations, efficiency of operations, and/or other actionable insights.

In embodiments, outputs of Block S340 can be used to guide recommended actions for improving operation of the hydraulic apparatus or maintaining proper operation of the hydraulic apparatus (e.g., with optional execution of recommended actions in Block S350).

In variations, recommended actions can include or be associated with one or more of: maintaining normal operation of subcomponents; responding to failed operation (e.g., leaking) of subcomponents; proactively correcting borderline operation (e.g., near failure) of subcomponents; responding to or otherwise correcting other undesired statuses of one or more of subcomponents of the hydraulic apparatus being monitored; providing information regarding subcomponent power consumption; performing inventory operations related to anticipated statuses of subcomponents (e.g., in relation to maintaining or adjusting inventory related to replacement subcomponents of a hydraulic apparatus); performing decision-making guidance (e.g., in relation to cost-benefit analyses of replacing vs. repairing subcomponents or apparatuses); facilitating proactive management of deployed equipment (e.g., individual apparatuses, equipment of a fleet, etc.); and performing other suitable actions.

Figure 9:
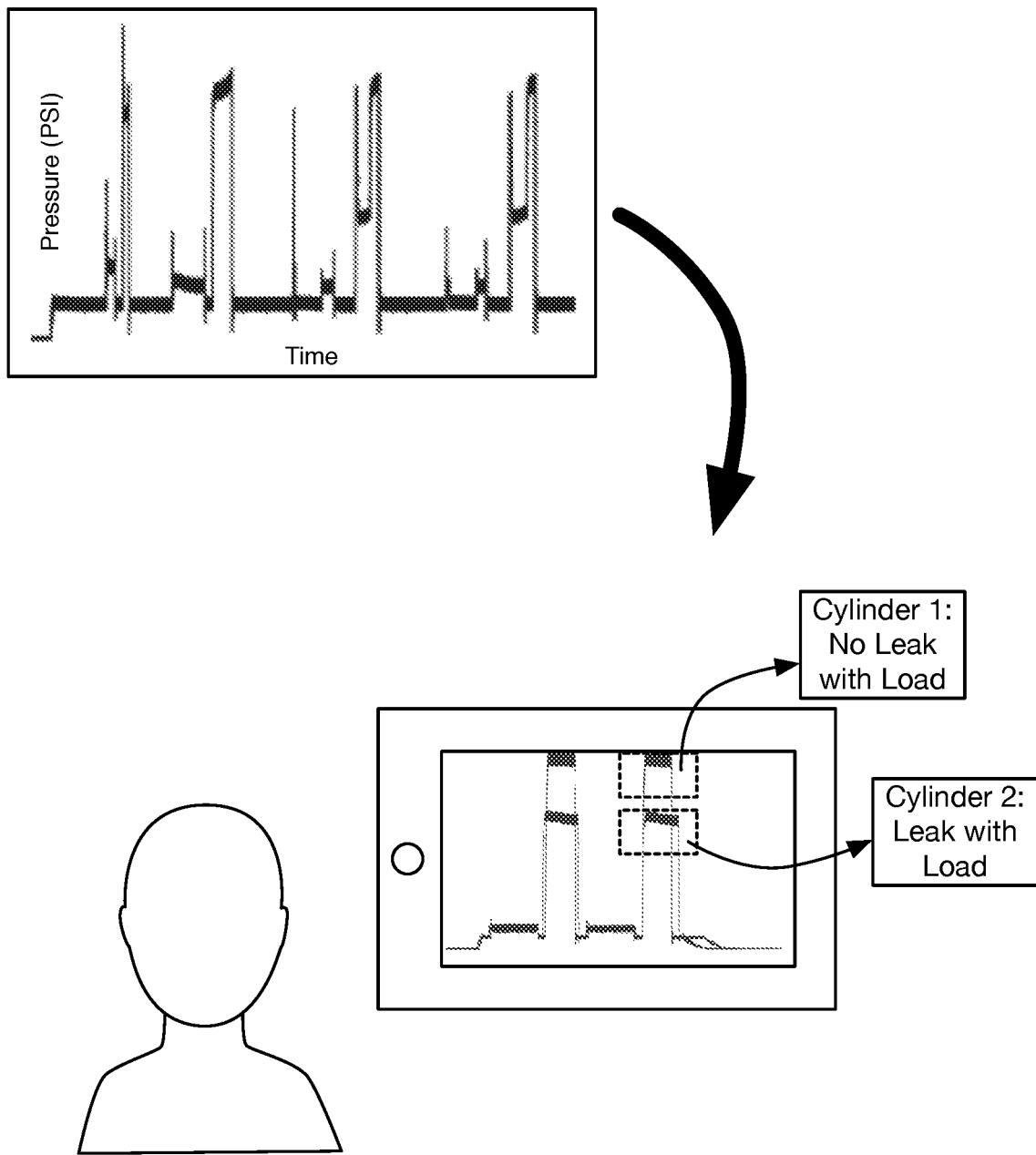
FIG. 9 depicts an example of a returned analysis associated with an embodiment of a method for hydraulic apparatus monitoring.

In an example, the analysis can indicate slow but high pressure and high flow actuation of a subcomponent, from unique signatures of Block S330, which indicates a leakage event (e.g., for a cylinder of the hydraulic apparatus). In an example related to fleet management, Block S340 can generate a recommended action to remotely deactivate a heavy mobile vehicle having a hydraulic apparatus (e.g., a Bobcat, an excavator, a crane, etc.) based upon an analysis that the hydraulic apparatus is near catastrophic failure (e.g., experiencing high levels of pump cavitation, as detected using the unique signatures of Block S330). In another example, Block S340 can trigger a notification to perform a maintenance check upon detecting a high number of events associated with a specific cylinder of a mobile vehicle hydraulic apparatus (e.g., based on unique signatures of Block S330). In another example, analysis of a fleet of mobile vehicles having hydraulic apparatuses can be used to generate recommendations for readjustment of inventory (e.g., by stopping orders of replacement components that still have long useful lives, by increasing orders of replacement components that are near the end of their useful lives, etc.). In another example, the recommended action can pertain to wear in a cylinder or the pump, in relation to performance and associated hydraulic fluid lines (e.g., based upon an analysis that the subcomponent(s) require more power to actuate than expected, based upon training data). In generating the analysis for this example, models associated with Block S330 can process mean time between failure (MTBF) for various subcomponents in order to predict the likelihood of failure within a given time period. In another example, as shown in FIG. 9, Block S340 can return an analysis visualizing leakage scenarios (e.g., no leak present, leak present) for a cylinder, in relation to extracted signatures associated with disaggregated information for the cylinder.

In generating recommended actions, Block S340 can include returning notifications or other information derived from the analyses in a visual format, in an audio format, in a haptic format, and/or in any other suitable observable format. As such, variations of Block S340 can include generating digital objects (e.g., in visual data formats, in audio data formats, in haptic data formats) or instructions for generating digital objects, in communication with client devices (e.g., devices that are associated with operators of the hydraulic apparatuses), where the client devices include visual output components (e.g., a display), audio output components (e.g., speaker), haptic output components (e.g., vibrators), and/or any other suitable components. Client devices can also include input components (e.g., keypads, touch displays, microphones, joysticks, mice, etc.) such that the operators or other entities associated with the hydraulic apparatus can communicate inputs (e.g., commands) related to the generated analyses.

In returning the analysis, Block S340 can include providing information in an automated manner based on thresholds that can be manually set at first and then later adjusted by the AI/NN based on confidence optimization or other factors. Block S340 can, however, include generation of analyses for other suitable recommended actions, provided in another suitable manner.

Block S350 recites: executing the recommended action, which functions to automatically execute recommended actions in order to reduce operator workload in relation to hydraulic apparatus management.

Executed actions can include or be associated with one or more of: responding to or otherwise correcting undesired statuses of one or more of subcomponents of the hydraulic apparatus being monitored; performing inventory operations related to anticipated statuses of subcomponents (e.g., in relation to maintaining or adjusting inventory related to replacement subcomponents of a hydraulic apparatus); performing decision-making guidance (e.g., in relation to cost-benefit analyses of replacing vs. repairing subcomponents or apparatuses); facilitating proactive management of deployed equipment (e.g., individual apparatuses, equipment of a fleet, etc.); and performing other suitable actions.

In an example, the analysis can indicate slow but high pressure and high flow actuation of a subcomponent, and Block S350 can execute instructions for correcting the leak (e.g., with proper sealing), and/or replacement of the leaking subcomponent. which indicates a leakage event (e.g., for a cylinder of the hydraulic apparatus). In an example related to fleet management, Block S350 can execute instructions for remotely deactivating a heavy mobile vehicle having a hydraulic apparatus (e.g., a Bobcat, an excavator, a crane, etc.) based upon an analysis that the hydraulic apparatus is near catastrophic failure (e.g., experiencing high levels of pump cavitation, based upon the analysis generated by way of Block S340). In another example, Block S350 can initiate automatic performance of a maintenance check upon detecting a high number of events associated with a specific cylinder of a mobile vehicle hydraulic apparatus (e.g., based upon the analysis generated by way of Block S340), with automated execution of a purchase of a replacement cylinder. In another example, Block S350 can automatically readjust inventory (e.g., by stopping orders of replacement components that still have long useful lives, by increasing orders of replacement components that are near the end of their useful lives, etc.) based upon an analysis generated by way of Block S340.

In executing recommended actions, Block S350 can include functionality for generating, transmitting, and/or executing instructions in a computer-readable format and stored in non-transitory media. In variations, such instructions can be generated, transmitted, and/or stored on components of the processing subsystem, client devices, inventory management platforms, vehicle computer architecture (e.g., firmware), industrial apparatus computer architecture (e.g., firmware), and/or other suitable components.

The system embodiment(s) can, however, be configured to implement other workflows including variations of those described, and/or other workflows.

4. Conclusions

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for monitoring an apparatus comprising motor components, the system comprising:
   a sensor cluster comprising a vibration sensor operatively coupled to a motor of the apparatus;
   a demand sensor comprising a link to a vehicle interface of a vehicle comprising the apparatus, the demand sensor configured to monitor operational demand of the vehicle;
   a sensor interface comprising a housing coupling the sensor cluster to the apparatus, wherein the vibration sensor is positioned to monitor vibration induced by the motor through the sensor interface;
   a monitor coupled to the sensor cluster through the sensor interface, the monitor comprising a controller for sampling data derived from the sensor cluster and transmitting data from the monitor; and
   a processing subsystem comprising a non-transitory computer-readable medium comprising instructions stored thereon, that when executed by the processing subsystem perform one or more steps of:

receiving a set of data streams, derived from outputs of the sensor cluster;
performing a set of transformation operations upon the set of data streams;
identifying a set of unique signatures corresponding to states of a set of subcomponents of the apparatus, from the set of transformation operations; and
returning an analysis comprising a recommended action for improving or maintaining proper performance of the apparatus, based upon the set of unique signatures.

2. The system of claim 1, wherein the sensor cluster further comprises a motion sensor.

3. The system of claim 1, wherein the set of subcomponents comprises at least one of: a turbine, a motor component, an engine component, and a pump component.

4. The system of claim 3, wherein the pump component comprises a hydraulic pump component.

5. The system of claim 1, wherein the sensor cluster comprises an ultrasonic sensor.

6. The system of claim 1, wherein the sensor cluster comprises a flow sensor, wherein the flow sensor is positioned within a channel of the sensor interface.

7. The system of claim 1, wherein the set of subcomponents comprises: a hydraulic fluid component, a filter component, an actuator component, a cylinder component, a valve component, and a pump component.

8. The system of claim 1, wherein the monitor further comprises a global positioning subsystem configured to track position of a vehicle comprising the hydraulic apparatus.

9. The system of claim 1, wherein the processing subsystem further comprises architecture for returning a status informative of power usage and management for the apparatus, based upon the analysis.

10. A method for monitoring an apparatus comprising motor components, the method comprising:
establishing an interface between a sensor cluster and the apparatus, the interface comprising a housing coupling the sensor cluster to the apparatus, wherein the sensor cluster comprises a vibration sensor positioned to monitor vibration induced by a motor of the apparatus, through the sensor interface;
sampling a set of data streams, derived from outputs of the sensor cluster;
performing a set of transformation operations upon the set of data streams, wherein the set of operations comprises processing the set of data streams with a neural network model;
identifying a set of unique signatures corresponding to states and events of a set of subcomponents of the apparatus, from the set of transformation operations; and
returning an analysis of the set of subcomponents of the apparatus, based upon the set of unique signatures.

11. The method of claim 10, wherein the sensor cluster further comprises a motion sensor.

12. The method of claim 10, wherein the set of subcomponents comprises at least one of: a turbine, a motor component, an engine component, and a pump component of the apparatus.

13. The method of claim 10, wherein the neural network model comprises recurrent neural network (RNN) architecture.

14. The method of claim 13, wherein the neural network model comprises architecture for encoding multivariate time series data of the set of data streams, in an unsupervised manner.

15. The method of claim 13, wherein performing the set of transformation operations comprises performing a masking operation with the set of data streams, and wherein the neural network model comprises an encoder structured to process outputs of the masking operation.

16. The method of claim 10, wherein outputs of the sensor cluster further comprise a position encoder output.

17. The method of claim 10, wherein identifying the set of unique signatures comprises:
collecting a set of training data streams from the sensor cluster, the set of training data streams corresponding to demand data, motion sensor data, and vibration data in association with subcomponents of the apparatus;
applying one or more of the set of transformation operations to the set of training data streams;
creating a training dataset derived from the set of training data streams and the set of transformation operations; and
training the neural network model in one or more stages, based upon the using the training dataset.

18. The method of claim 17, wherein training the neural network model comprises performing unsupervised training with the set of training data streams in a first phase, and performing back-propagation in a second phase.

19. The method of claim 10, wherein returning the analysis comprises returning information pertaining to a failure event and a cause of the failure event of a subcomponent of the apparatus.

20. The method of claim 19, wherein the failure event comprises a subcomponent wear-associated event, the method further comprising returning, based upon the analysis, a recommended action for improving or maintaining proper performance of the apparatus.

* * * * *